United States Patent [19]
Ikebe et al.

[11] Patent Number: 5,860,611
[45] Date of Patent: Jan. 19, 1999

[54] TAPE CASSETTE AND RECORDING AND REPRODUCING APPARATUS

[75] Inventors: Masaru Ikebe; Motohiko Shima, both of Saku, Japan

[73] Assignee: TDK Corporation, Japan

[21] Appl. No.: 601,679

[22] Filed: Feb. 15, 1996

[30] Foreign Application Priority Data

| Feb. 21, 1995 | [JP] | Japan | 7-055176 |
| Apr. 24, 1995 | [JP] | Japan | 7-120377 |
| Jun. 29, 1995 | [JP] | Japan | 7-186312 |
| Jun. 29, 1995 | [JP] | Japan | 7-186313 |
| Oct. 13, 1995 | [JP] | Japan | 7-290689 |

[51] Int. Cl.$^6$ .......... G11B 23/087; G11B 23/04
[52] U.S. Cl. .......... 242/343; 242/338.3; 360/132; 360/137
[58] Field of Search .......... 242/338.3, 343, 242/343.2; 360/132, 137

[56] References Cited

U.S. PATENT DOCUMENTS 4,801,107  1/1989  Dixon et al. .......... 242/338.3

FOREIGN PATENT DOCUMENTS

| 61-83180  | 6/1986 | Japan . |
| 61-83181  | 6/1986 | Japan . |
| 6-89528   | 3/1994 | Japan . |
| 6-103725  | 4/1994 | Japan . |

Primary Examiner—John Q. Nguyen
Attorney, Agent, or Firm—Lerner, David, Littenberg, Krumholz & Mentlik

[57] ABSTRACT

A tape cassette capable of exhibiting satisfactory resistance to shock to prevent sagging of a tape. During non-use of a tape cassette, a lock member prevents a reel brake member urged by elastic force so as to be engaged with tape reels from being moved in a lock release direction due to shock. When the tape cassette is charged in a recording and reproducing apparatus, the lock member is actuated by a lock release element of the apparatus, to thereby release the reel brake member from engagement with the lock member.

34 Claims, 24 Drawing Sheets

FIG. 10
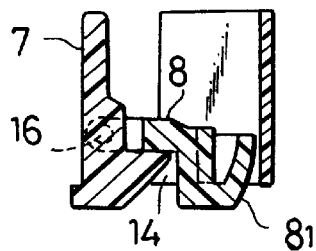
FIG. 11
FIG. 12
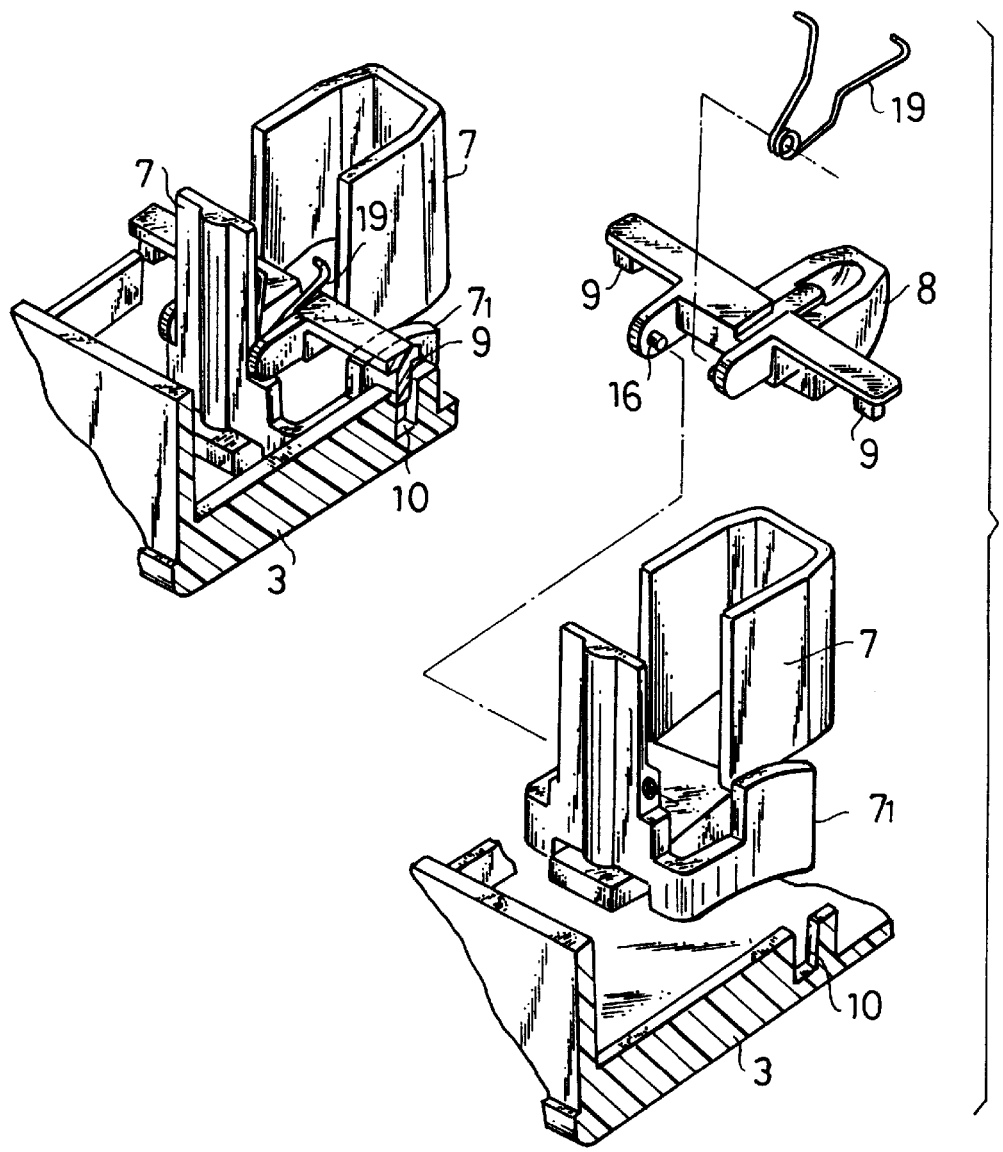

TAPE CASSETTE AND RECORDING AND REPRODUCING APPARATUS

BACKGROUND OF THE INVENTION

This invention relates to a tape cassette used for a magnetic recording and reproducing apparatus, such as, for example, a video tape recorder (VTR) or the like, and more particularly to a tape cassette such as a video tape cassette, an 8 mm video cassette, D-VCR cassette or the like which is provided therein with a reel brake member for regulating or preventing rotation of tape reels having a tape wound thereon in non-use of the tape cassette and a recording and reproducing apparatus charged therein with such a tape cassette.

In general, a tape cassette has a pair of tape reels received therein which have a tape-like medium wound thereon. Also, the tape cassette has a brake mechanism incorporated therein for keeping the tape reels from being rotated in non-use of the tape cassette. In the brake mechanism which has been used for this purpose, an elastic member such as a torsion coil spring or a leaf spring is used for urging a brake member against indentations of a teeth-like, shape provided on an outer periphery of a flange of each of the tape reels. When the tape cassette thus constructed is charged in a recording and reproducing apparatus, a brake release member of the apparatus is abutted against the brake member to move it against elastic force of the spring, to thereby release the tape reels from the brake member, resulting in the tape reels being rotated.

Unfortunately, when force of a level exceeding elastic force of the elastic member such as strong shock due to dropping of the tape cassette or the like is applied to the tape cassette, the conventional brake mechanism causes movement of the brake member, to thereby release the tape reels from the brake member, leading to rotation of the tape reels, resulting in sagging of the tape, because the brake member is merely forced against the tape reels by only elastic force of the elastic member. Thus, charging of the tape cassette in the recording and reproducing apparatus causes the tape to be caught by a rotation head of the apparatus, leading to problems such as damage to the tape, a failure in traveling of the tape and the like. In the worst case, this causes a failure in ejecting the tape cassette from the recording and reproducing apparatus.

Another brake mechanism is known wherein a hub brake is provided in association with a pivotal lid, resulting in being locked by the lid. The brake mechanism is disclosed in Japanese Patent Application Laid-Open Publication No. 103725/1994. The brake mechanism requires to form a gap between a lock section of the hub brake and the lid. Unfortunately, this fails in effective and positive locking of the hub brake by the lid and cannot be applied to a tape cassette wherein a lower flange of tape reels is provided with an engagement, like a video cassette tape.

A further reel brake mechanism is proposed wherein a pair of reel brake members are urged independently from each other by means of a spring, to thereby provide the reel brake structure with resistance to impact. The reel brake mechanism is disclosed in Japanese Patent Application Laid-Open Publication No. 89528/1994. However, the mechanism requires to increase elastic force in order to ensure positive locking of the reel brake members. Also, such an increase in elastic force causes increased force to be required for releasing the locking.

SUMMARY OF THE INVENTION

The present invention has been made in view of the foregoing disadvantages of the prior art.

Accordingly, it is an object of the present invention to provide a tape cassette which is capable of keeping tape reels from being moved in non-use of the tape cassette even when increased shock is applied to the tape cassette due to dropping thereof or the like.

It is another object of the present invention to provide a tape cassette which is capable of effectively preventing sagging of a tape in non-use thereof even when strong shock is applied to the tape cassette due to dropping thereof or the like.

It is a further object of the present invention to provide a tape cassette which is capable of exhibiting increased reliability and quality.

It is still another object of the present invention to provide a tape cassette which is capable of being simplified in both manufacture and structure and improved in operability.

It is yet another object of the present invention to provide a tape cassette which is capable of being readily assembled.

It is a still further object of the present invention to provide a recording and reproducing apparatus which is capable of suitably charging therein with a tape cassette accomplishing the above-described objects.

In accordance with one aspect of the present invention, a tape cassette is provided. The tape cassette includes a casing and a pair of tape reels having a tape wound thereon and rotatably received in the casing. The tape is arranged so as to travel from any one of the tape reels to the other thereof while being guided along a front portion of the casing and stretched between the tape reels and the casing is formed with an opening through which the tape is exposed at the front portion of the casing. The tape cassette also includes a lid for selectively closing the opening. The casing is formed with tape access ports through which the tape is led out to the front portion of the casing. The tape cassette further includes a reel brake member detachably engaged with the tape reels for selectively preventing rotation of the tape reels, a lock member arranged for regulating movement of the reel brake member in a brake release direction, an engagement means provided at the casing and a holding means provided at the lock member so as to be detachably engaged with the engagement means of the casing.

In a preferred embodiment of the present invention, the casing is formed with a through-hole via which a brake release means of a recording and reproducing apparatus is inserted into said casing. The tape reels each include a flange provided on an outer periphery thereof with indentations and the reel brake member includes a pair of brake pawls engageable with the indentations of the tape reels and a brake release actuation section arranged in proximity to the through-hole of the casing and adapted to be abutted against the brake release means of the recording and reproducing apparatus.

In a preferred embodiment of the present invention, the reel brake member is arranged between the tape reels in a manner to be in proximity to an inner side surface of the casing opposite to the opening.

In a preferred embodiment of the present invention, the lock member is moved due to it being engaged with the brake release means of the recording and reproducing apparatus, to thereby release engagement of the holding means of the lock member with the engagement means of the casing, resulting in regulation of movement of the reel brake member being released.

In a preferred embodiment of the present invention, the engagement means of the casing is provided at a portion of the casing defined outside of a range of movement of the reel brake member. The lock member includes an actuation section vertically slidably fitted in the reel brake member and including a portion arranged in proximity to the through-hole of the casing and the holding means of the lock member is formed so as to extend from the actuation section and urged in a direction of engagement with the engagement means of the casing by an elastic member.

In a preferred embodiment of the present invention, the engagement means is provided at a portion of the casing defined outside of a range of movement of the reel brake member and the lock member includes a lock release actuation section pivotally supported at a pivotal support section provided on one of the reel brake member and casing and having a portion arranged in proximity to the through-hole of the casing. The holding means of the lock member is formed so as to extend from the lock release actuation section.

In a preferred embodiment of the present invention, the holding means of the lock member is urged in a direction of engagement with the lock section by an elastic member.

In a preferred embodiment of the present invention, the lock member includes an arm extending from the reel brake member so as to be elastically deformable and the holding means of the lock member is arranged at a distal end of the arm. The engagement means of the casing comprises a hole formed through a lower wall of the casing and the holding means of the lock member is detachably fitted in the hole.

In a preferred embodiment of the present invention, the casing is formed with a through-hole via which a reel brake release means of a recording and reproducing apparatus is inserted into the casing. The tape reels each include a flange provided on an outer periphery thereof with indentations and the reel brake member includes an operation member arranged in proximity to the through-hole of the casing and adapted to be abutted against the reel brake release means of the recording and reproducing apparatus, brake pawls engageable with the indentations of the tape reels and arranged so as to be movable due to movement of the operation member, and an elastic member for elastically forcing the operation member and brake pawls.

In a preferred embodiment of the present invention, the lock member includes a second holding means engageable with the brake pawls of the brake member, wherein engagement of the holding means of the lock member with the engagement means of the casing and engagement of the second holding means of the lock member with the brake pawls of the brake member leads to regulation of movement of the brake pawls, to thereby regulate movement of the reel brake member.

In a preferred embodiment of the present invention, the lock member permits movement of the reel brake member within a range which keeps the brake pawls from being disengaged from the indentations of the tape reels while the brake pawls are kept engaged with the indentations of the tape reels during non-use of the tape cassette, wherein further movement of the reel brake member exceeding the range is regulated due to abutment of the holding means of the lock member against the engagement means of the casing.

In a preferred embodiment of the present invention, the brake release actuation section of the reel brake member includes an inclined surface arranged in proximity to the through-hole of the casing and adapted to be abutted against the brake release means of the recording and reproducing apparatus and the lock member includes a lock release actuation section arranged so as to positionally correspond to the inclined surface and be moved close to and away from the inclined surface.

In a preferred embodiment of the present invention, the engagement means of the casing is provided at a portion of the casing defined outside of a range of movement of the reel brake member and the lock member includes a lock release actuation section pivotally supported at a pivotal support section provided on one of the reel brake member and casing and arranged in proximity to the through-hole of the casing. The holding means of the lock member is formed so as to extend from the lock release actuation section and the lock member is forced by an elastic member so as to take a posture which permits the holding means of the lock member to be engaged with the engagement means of the casing.

In a preferred embodiment of the present invention, the brake pawls of the reel brake member each include a thin-wall hinge section, to thereby be elastically deformable, and are forced in a direction of engagement with the indentations of the tape reels, so that the lock member keeps engagement of the brake pawls with the indentations of the tape reels when the holding means of the lock member takes the posture which permits the holding means of the lock member to be engaged with the engagement means of the casing.

In a preferred embodiment of the present invention, the holding means of the lock member and the engagement means of the casing, when any external force is not applied to the tape reels, are arranged so as to define a gap therebetween, to thereby be prevented from being engaged with each other.

In a preferred embodiment of the present invention, the reel brake member is formed with cam grooves. The lock member includes a lock release actuation section slidably supported in the cam grooves of the reel brake member and including a portion arranged in proximity to the through-hole of the casing and the lock member is forced by an elastic member so as to take a posture which permits the holding means of the lock member to be heldly engaged with the engagement means of the casing.

In a preferred embodiment of the present invention, the lock member includes a lock release actuation section including a portion arranged in proximity to the through-hole of the casing and support pins through which the lock member is pivotally supported on a pivotal support section provided on the reel brake member and the lock member is so constructed that an edge of the lock release actuation section of the lock member facing the support pins and an edge of the holding means of the lock member facing the lock release actuation section are defined on an identical plane.

In a preferred embodiment of the present invention, the through-hole of the casing is formed at a bottom wall of the casing. The brake release actuation section of the reel brake member has an inclined surface arranged in proximity to the through-hole of the casing and adapted to be abutted against the brake release means of the recording and reproducing apparatus and the lock member includes a lock release actuation section arranged so as to positionally correspond to the inclined surface and be moved close to and away from the inclined surface. The lock release actuation section has a bottom surface formed with a width smaller than that of the through-hole of the casing. The bottom surface of the lock release actuation section is positioned in a thickness of the bottom wall of the casing when the lock member is in a lock position.

In a preferred embodiment of the present invention, the lock release actuation section of the lock member has a width substantially equal to a distance between opposite inner surfaces of the reel brake member along which the lock release actuation section is moved and is chamfered at each of both side edges of the bottom surface thereof to provide an inclination.

In a preferred embodiment of the present invention, the lock member includes support pins through which the lock member is pivotally supported on a pivotal support section provided on the reel brake member. The reel brake member includes a connection for connecting the brake release actuation section and brake pawls to each other and the lock member includes a torsion spring for urging the lock member to a lock position. The torsion spring has a coil portion fitted on each of the support pins of the lock member and held at one end thereof in a first spring receiving recess formed at the lock member and at the other end thereof in a second spring receiving recess formed between a projection provided on the connection of the reel brake member and a side surface of the brake release actuation section.

In a preferred embodiment of the present invention, the lock member includes support pins through which the lock member is pivotally supported on a pivotal support section provided on the reel brake member. The support pins each is formed into a substantially elliptic shape in cross-section so as to have a width-reduced flat portion formed by partially flatly removing a surface of the support pin and a round portion other than the width-reduced portion and the pivotal support section of the reel brake member has an opening formed with a dimension substantially equal to a width of the width-reduced portion of the support pin or less so as to permit the support pin to be inserted into the pivotal support section therethrough.

In a preferred embodiment of the present invention, the support pins of the lock member are each provided on a distal end thereof with a flange abutted against a side surface of the pivotal support section.

In a preferred embodiment of the present invention, the torsion spring is so formed that one end thereof is extended in a tangential direction of the coil portion and bent at an obtuse angle and the other end thereof is extended in a tangential direction of the coil portion and bent at a substantially right angle.

In a preferred embodiment of the present invention, the reel brake member is made of a material different from that of the lock member.

In a preferred embodiment of the present invention, the reel brake member is made of a composite material comprising any one base component selected from the group consisting of polyacetal resin and polypropylene resin and an elastomer component added in an amount of 5 to 30 wt % to the base component.

In a preferred embodiment of the present invention, the composite material contains a lubricant in an amount of 1 to 10 wt %.

In a preferred embodiment of the present invention, the lock member is made of any one material selected from the group consisting of polyacetal resin, polycarbonate resin, and a composite material consisting of polyacetal resin or polycarbonate resin and an inorganic additive added thereto in an amount of 3 to 20 wt %.

In a preferred embodiment of the present invention, the lubricant is selected from a group consisting of silicone and silicon.

In a preferred embodiment of the present invention, the inorganic additive is glass fiber.

In a preferred embodiment of the present invention, the the inorganic additive is calcium carbonate.

In a preferred embodiment of the present invention, the elastomer component is butadiene rubber.

In accordance with another aspect of the present invention, a recording and reproducing apparatus is provided which is charged therein with a tape cassette including a casing in which a pair of tape reels having a tape-like medium wound thereon are rotatably received therein, a reel brake member engaged with the tape reels to brake rotation of the tape reels during non-use of the tape cassette and a lock member for regulating movement of the reel brake member. The apparatus includes a regulation release means for releasing regulation of the lock member and a reel brake release means for releasing braking of the reel brake member, whereby the lock member is released prior to operation of release of the reel brake member.

In a preferred embodiment of the present invention, the brake release means acts as the regulation release means as well.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein:

FIG. 10 is a vertical sectional view showing a variation of the lock member of FIG. 4;

FIG. 11 is a fragmentary perspective view in section showing arrangement of the lock member of FIG. 10 with respect to a reel brake member;

FIG. 12 is an exploded perspective view of the arrangement shown in FIG. 11;

DETAILED DESCRIPTION OF THE PREFERRED EMBODIMENTS

Figure 1:
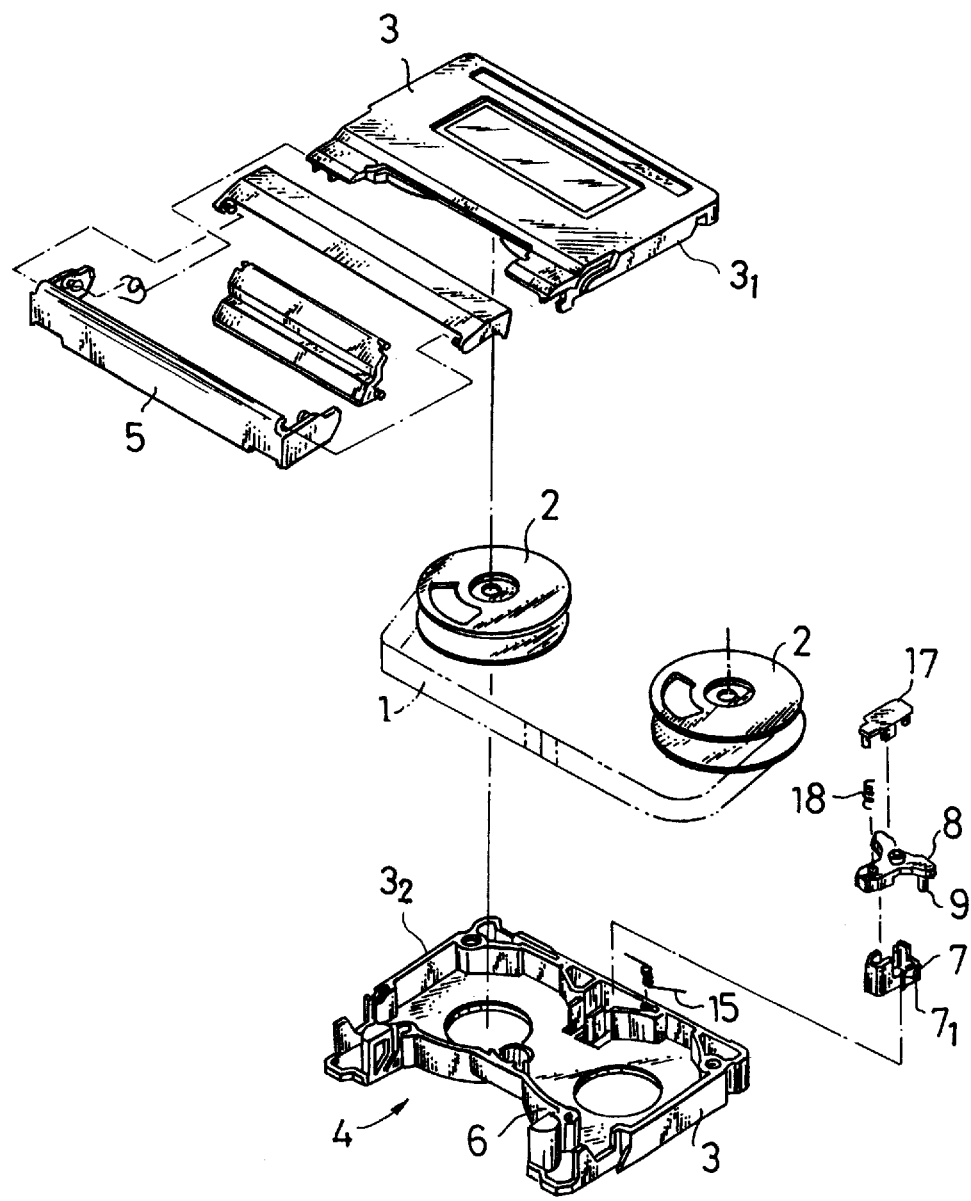
FIG. 1 is an exploded perspective view showing an embodiment of a tape cassette according to the present invention.
Figure 2:
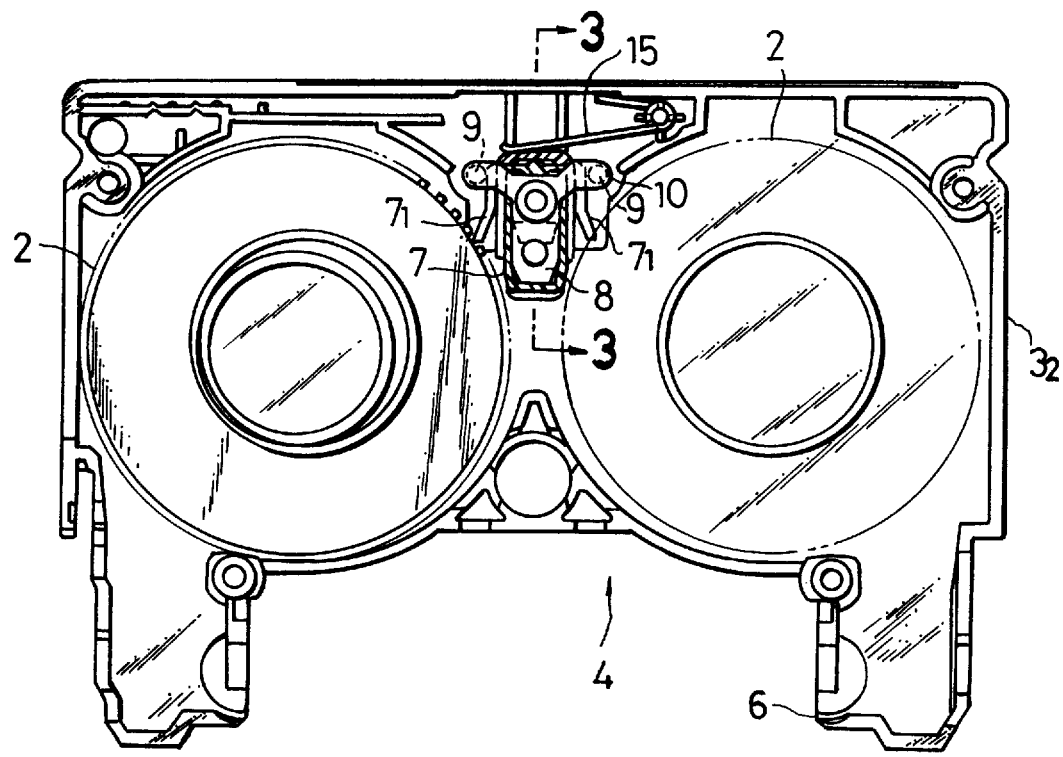
FIG. 2 is an enlarged plan view showing a lower casing member in the tape cassette of FIG. 1 in which a lock member is incorporated.

Now, the present invention will be described hereinafter with reference to the accompanying drawings.

Referring first to FIGS. 1 to 7, an embodiment of a tape cassette according to the present invention is illustrated. A tape cassette of the illustrated embodiment includes a tape 1, a pair of tape reels 2 on which the tape 1 is wound, a casing 3 including an upper casing member $3^1$ and a lower casing member $3_2$ joined to each other to define a space therein in which the tape reels 2 are rotatably received. The tape 1 is delivered from any one of the tape reels 2 to the other tape reel while being stretched between the tape reels and exposed at a front portion of the casing 3. For this purpose, the casing 3 is provided at the front portion thereof with an opening 4 through which the tape 1 is exposed. The opening 4 is selectively closed with a lid 5 pivotally mounted on the casing 3. The casing 3 is also provided at the front portion thereof with tape access ports 6 from which the tape 1 is led out. The tape cassette also includes a reel brake member 7 detachably engaged with the tape reels 2 to selectively restrain or prevent rotation of the tape reels 2.

Figure 4:
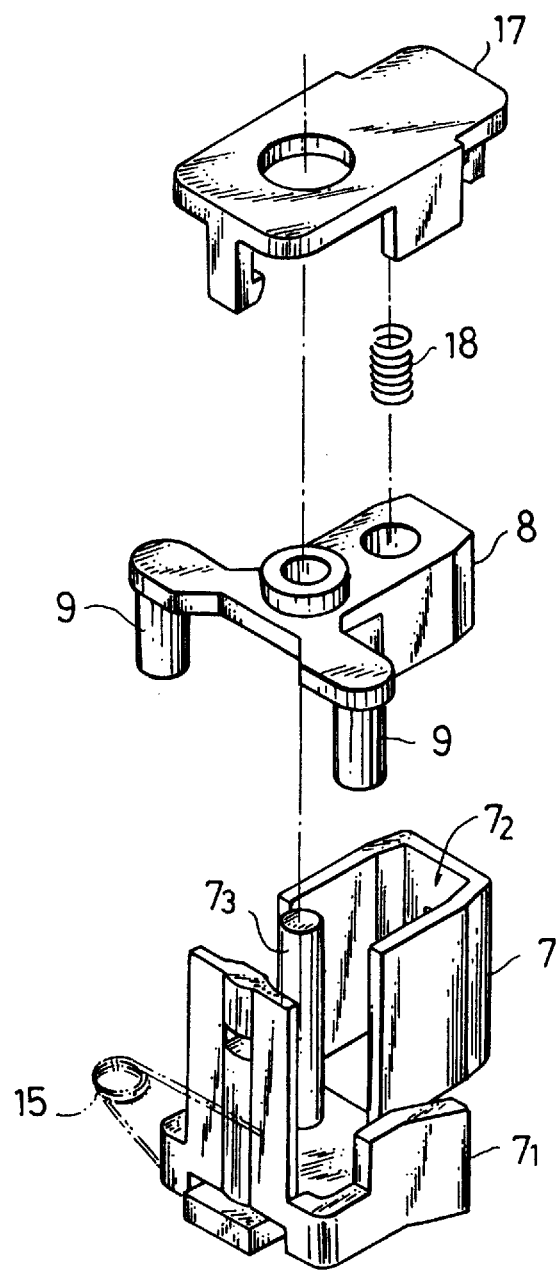
FIG. 4 is an exploded enlarged perspective view showing a reel brake member and a lock member.

Also, the tape cassette includes a lock member 8 arranged in the reel brake member 7, so as to be vertically slidable resulting in preventing, in non-use of the tape cassette, movement of the reel brake member 7 in a brake release direction or in a direction in which the reel brake member 7 is released from engagement with the tape reels 2, to thereby lock the reel brake member 7 and permitting, in use of the tape cassette, movement of the reel brake member 7 in the brake release direction. The lock member 8, as shown in FIG. 4, includes a pair of holding sections 9, which are adapted to be detachably engaged with engagements 10 provided on the casing 3. The lock member 8 is actuated by a regulation release means 12 provided on a recording and reproducing apparatus 11 or a brake release means 13 provided on the apparatus 11 so as to carry out regulation release as well as brake release.

The reel brake member 7 is arranged between the tape reels 2 in a manner to be in proximity to an inner rear surface of the casing 3 opposite to the opening 4 and includes a pair of brake pawls $7_1$ positioned between the tape reels 2 and each heldly engageable with indentations provided in a manner like teeth of a gear on an outer periphery of a flange of each of the tape reels 2. The reel brake member 7 is provided on a lower surface thereof with a recess 14 in which the brake release means 13 of the recording and reproducing apparatus 11 is inserted. The reel brake member 7 thus constructed is urged by a spring 15 so as to be moved in a braking direction when a cam rod of the brake release means 13 is not fitted in the recess 14.

Figure 5:
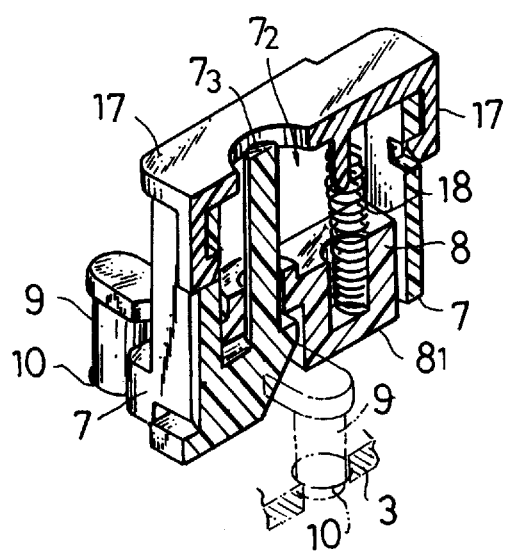
FIG. 5 is a fragmentary perspective view in section showing arrangement of the reel brake member and lock member shown in FIG. 4.
Figure 6:
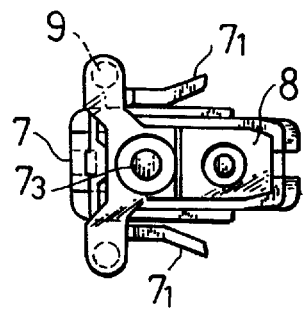
FIG. 6 is a plan view showing arrangement of the reel brake member and lock member shown in FIG. 4.
Figure 8:
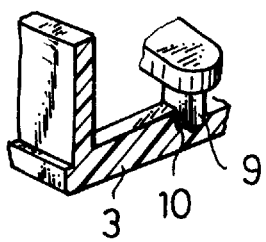
FIG. 8 is a fragmentary perspective view in section showing another example of arrangement of the lock member shown in FIG. 4.
Figure 7:
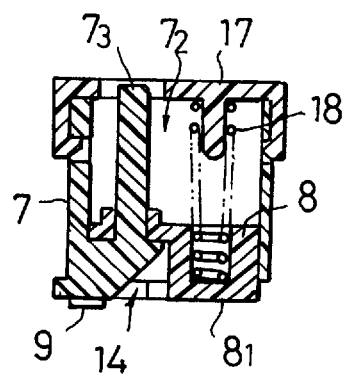
FIG. 7 is a vertical sectional view of the arrangement shown in FIG. 6.

The lock member 8, in use of the tape cassette, is engaged through the regulation release means 12 of the recording and reproducing apparatus 11 with the brake release means 13 to move the reel brake member 7 in a direction of releasing regulation of movement of the member 7, to thereby release the holding sections 9 of the lock member 8 from the engagements 10 of the casing 3, resulting in the lock member 8 being released from engagement with the casing 3. In the illustrated embodiment, the engagements 10 of the casing 3 may each be in the form of a through-hole, a recess or a groove formed at the lower casing member $3_2$. This causes the tape reels 2 to be released from engagement with the reel brake member 7, resulting in ensuring free rotation of the tape reels. Also, the lock member 8 is vertically movably fitted on a vertically extending rod $7_3$ arranged in a recess $7_2$ of the reel brake member 7 and fitted in a spring lock cover 17 while being urged in one direction by a spring 18. Further, the lock member 8, as described above, includes a pair of the holding sections 9 adapted to be fitted in the engagements 10 of the casing 3. In the illustrated embodiment, the holding sections 9 are each provided in the form of a pin. More particularly, the lock member 8, as shown in FIG. 5, includes an actuation section $8_1$ vertically slidably fitted in the reel brake member 7 and including a portion exposed from the casing 3 and the above-described holding sections 9 extending from the actuation section 8 and detachably engaged with the through-holes or engagements 10 provided at a portion of the casing 3 outside of a range of movement of the reel brake member 7. The elastic member or spring 18 acts to urge the lock member 8 in a direction in which the holding sections 9 are engaged with the engagements 10 of the casing 3. Alternatively, the holding sections 9 of the lock member 8, as shown in FIG. 8, may each be provided in the form of a rib. In this instance, each of the engagements 10 of the casing 3 may be formed into a recess-like shape, in which the holding section or rib is abuttedly received.

Referring now to FIGS. 10 to 12, a modification of the lock member 8 is illustrated. A lock member 80 of the modification pivotally connected to the reel brake member 70 or casing 30 through pins 16 and urged by means of a torsion spring 19. The lock member 80 includes holding sections 90 formed into a projection-like shape and detachably engaged with the engagements or recesses 100 of the casing 30. The lock member 80 is operated by the brake release means 13 of the recording and reproducing apparatus exhibiting a regulation release function as well as a brake release function. In the modification, the lock member 80 includes an actuation section $80_1$, pivotally supported on a pivotal support section of the reel brake member 70 for the pins 16 and having a portion exposed from the casing 3 and the holding sections 9 extending from the actuation section $80_1$ so as to be positioned out of a range of movement of the reel brake member 70 and releasably engaged with the engagements 100 of the casing 3. The elastic member or spring 19 serves to force the lock member 80 in a direction of engaging the holding sections 90 with the engagements 100 of the casing 30.

Referring now to FIGS. 13 to 19, a modification of the tape cassette shown in FIG. 1 to 9 is illustrated. In a tape cassette of the modification, a reel brake member 7 and a lock mechanism 8 are constructed into an integral structure. More particularly, the reel brake member 7 has an arm 20 extending therefrom so as to be elastically deformable. The arm 20 is provided at a distal end thereof with a lock section 21 of a projection-like shape, which is detachably fitted in a hole 22 provided on a lower wall of a lower casing member $3_2$, to thereby regulate movement of the reel brake member 7.

The hole 22 in which the lock section 21 is fitted is formed in a guide recess 23 formed so as to inwardly extend from at least one side end of a lower surface of the lower casing member $3_2$ in such a manner that the hole 22 and guide recess 23 each have a width larger than that of a regulation release member 12 provided on a cassette holder $12_1$ of a recording and reproducing apparatus 11.

Figure 21:
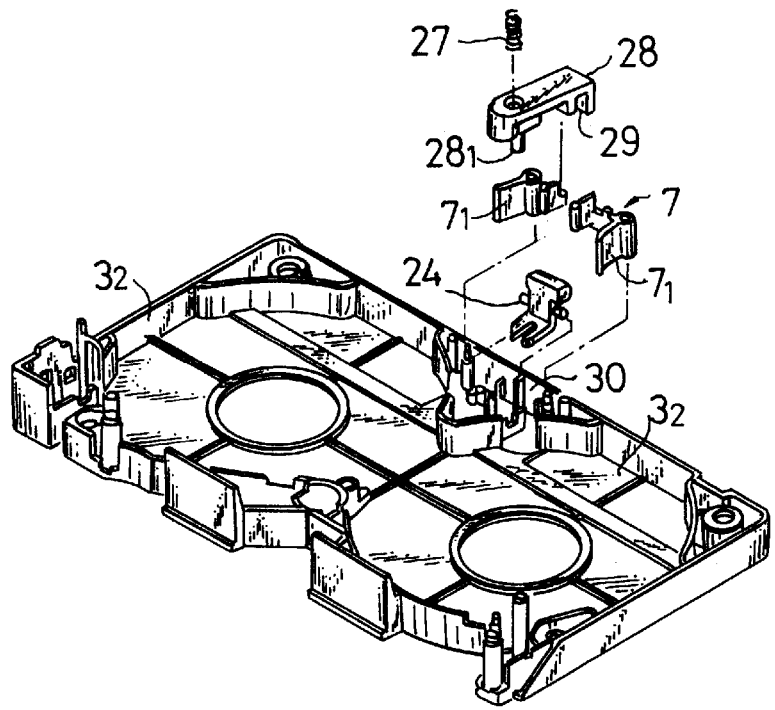
FIG. 21 is an exploded perspective view showing arrangement of a lock member with respect to a reel brake member and a lower casing member in another modification of the tape cassette shown in FIG. 1.
Figure 22:
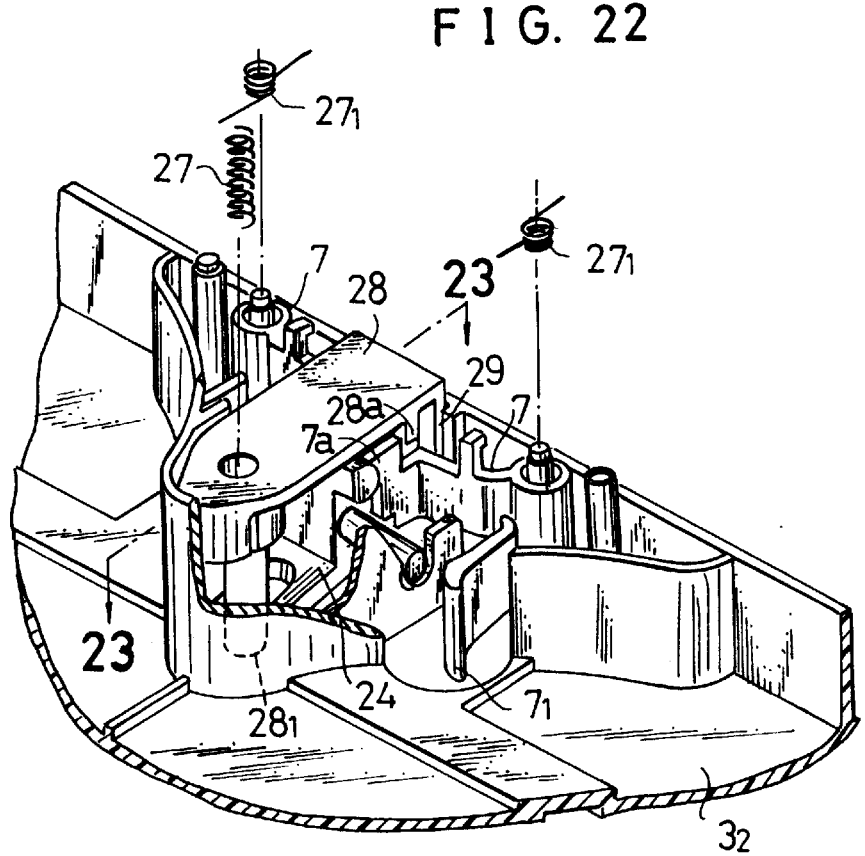
FIG. 22 is a fragmentary perspective view of the arrangement shown in FIG. 21.
Figure 23:
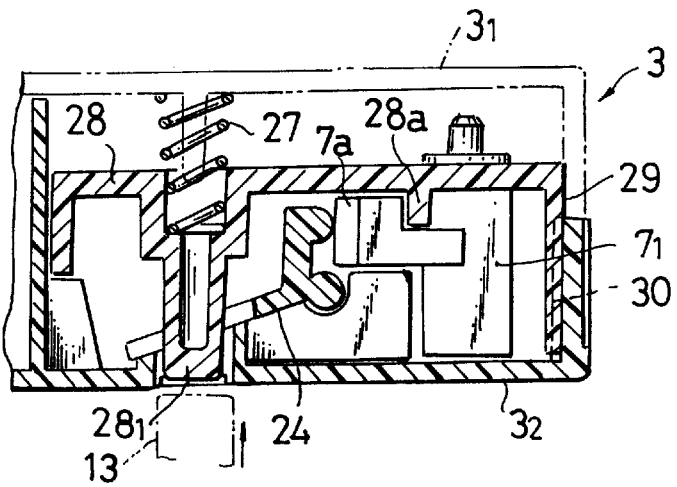
FIG. 23 is a fragmentary vertical sectional view taken along line 23—23 of FIG. 22.

Referring now FIGS. 21 to 23, another modification of the tape cassette shown in FIG. 1 is illustrated. A tape cassette of the modification is constructed so as to be applied to a brake mechanism such as a VHS and more specifically to a reel brake constructed of an operation member 24 and a pair of brake pawls $7_1$. More particularly, a reel brake member 7 includes the operation member 24 exposed from a casing 3 and adapted to be abutted against a reel brake release means 13, the brake pawls $7_1$ engageable with indentations formed on an outer periphery of a flange of each of tape reels 2 and arranged so as to be pivotable or movable due to movement of the operation member 24, and elastic members $27_1$ for elastically forcing the operation member 24 and brake pawls $7_1$. Also, in the illustrated embodiment, a lock member 28 for regulating movement of the reel brake member 7 in a brake release direction or in a direction in which the reel brake member 7 is released from engagement with tape reels is urged toward the reel brake member 7 by means of a spring 27, resulting in being engaged with or disengaged from the reel brake member 7. Also, the lock member 28 includes a pair of holding sections 29 vertically slidably supported on engagements 30 provided on the casing 3 and is actuated by a regulation release means of a recording and reproducing apparatus or a brake release means thereof exhibiting a regulation release function as well as a brake release function.

In the illustrated embodiment, the lock member 28 includes a pin-like abutment $28_1$ fitted in a hole of the operation member 24 and the above-described holding sections 29 each formed into a shape like a bent tongue. The holding sections 29 are engaged with the engagements 30 provided at the casing 3. Also, the lock member 28 is provided thereon with a projection 28a, which is engaged with an upper projection 7a provided on each of the brake pawls $7^1$ to regulate movement of the brake pawls $7_1$. The lock member 28 is released from the engagement by the brake release means of the recording and reproducing apparatus.

In the above-described embodiment, movement of the lock section or lock member of the reel brake mechanism and urging of the lock member by the elastic member are carried out in a direction different from that of movement of the reel brake member in view of a direction of dropping of the tape cassette. When the reel brake member 7 is moved in a horizontal direction, a thickness direction (vertical direction) of the casing is desirably defined so as to be perpendicular thereto.

Also, sagging of the tape may be more positively prevented by urging the brake pawls in a direction of tightening the tape wound. This permits the tape reels to be rotated in a direction of tightening the tape when the reel brake member is engaged with the tape reels, to thereby effectively prevent malfunction in charging of the tape cassette in the recording and reproducing apparatus and sagging of the tape due to repeated charging of the tape cassette in the apparatus.

Figure 3:
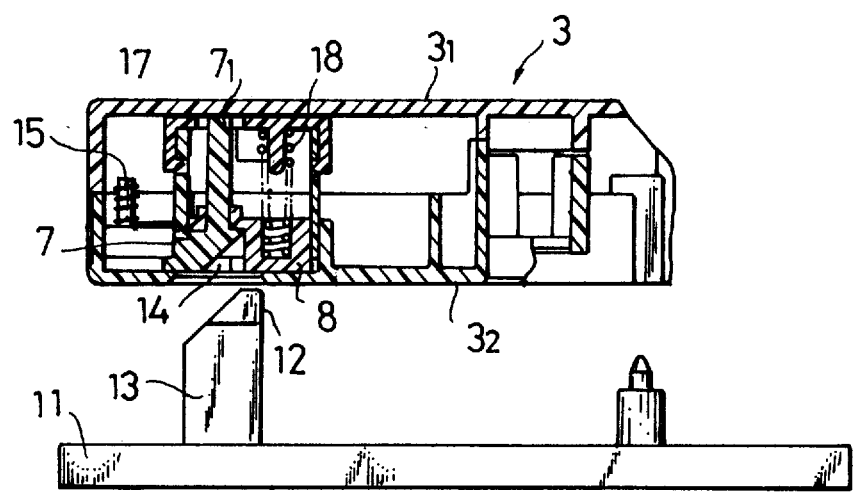
FIG. 3 is a fragmentary enlarged vertical sectional view taken along line 3—3 of FIG. 2.
Figure 9:
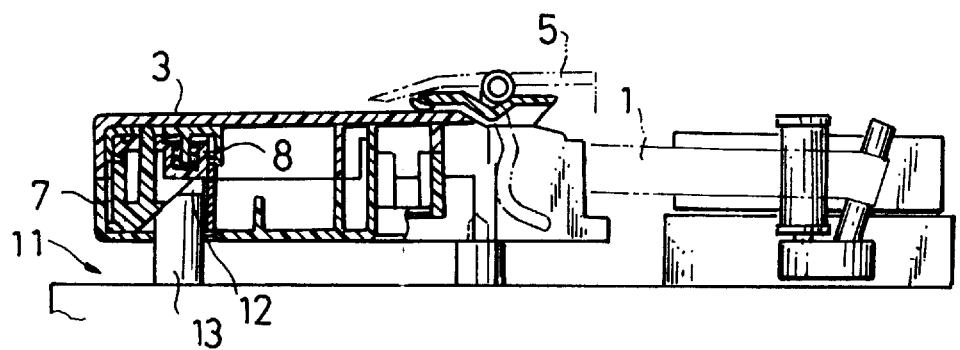
FIG. 9 is a vertical sectional view showing a recording and reproducing apparatus which is adapted to be charged therein with a tape cassette of the present invention.
Figure 13:
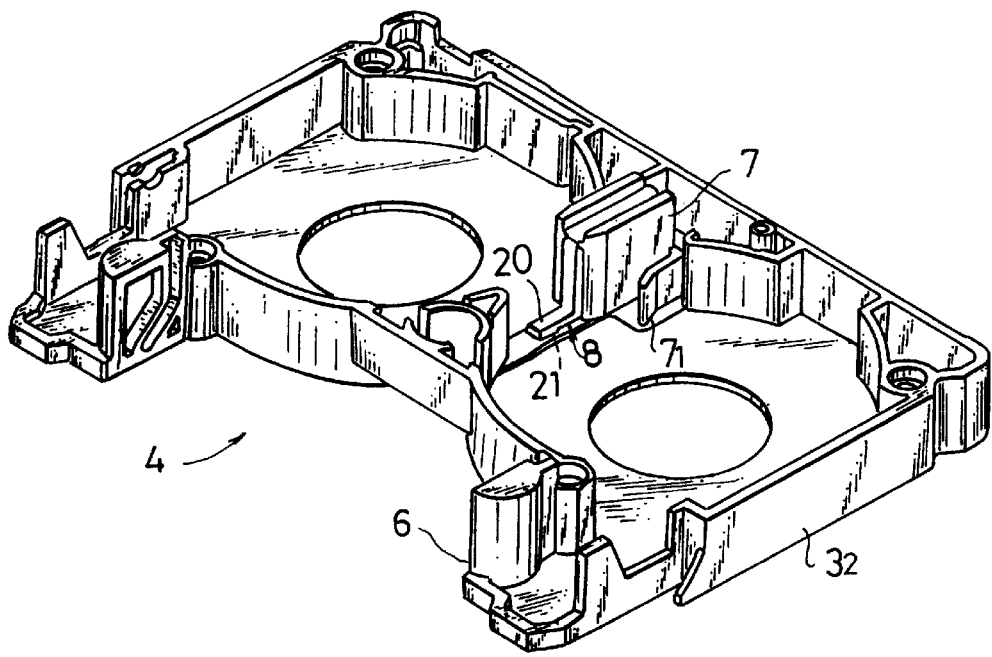
FIG. 13 is a perspective view showing a lower casing member incorporated in a modification of the tape cassette shown in FIG. 1.
Figure 14:
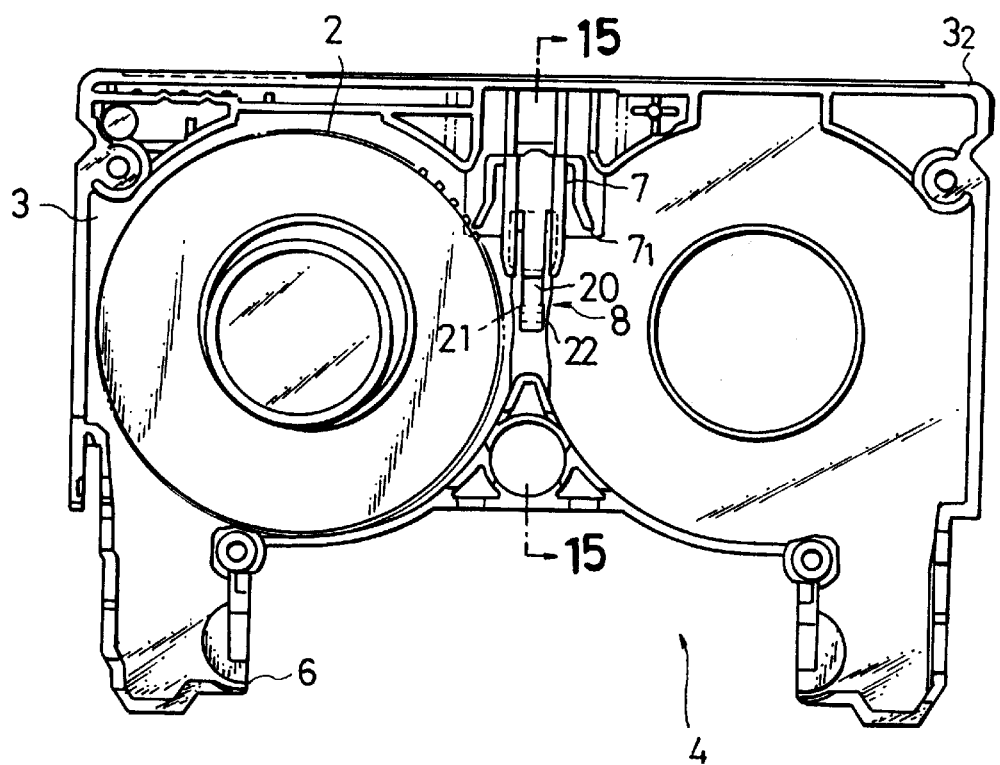
FIG. 14 is a plan view of the lower casing member shown in FIG. 13.
Figure 15:
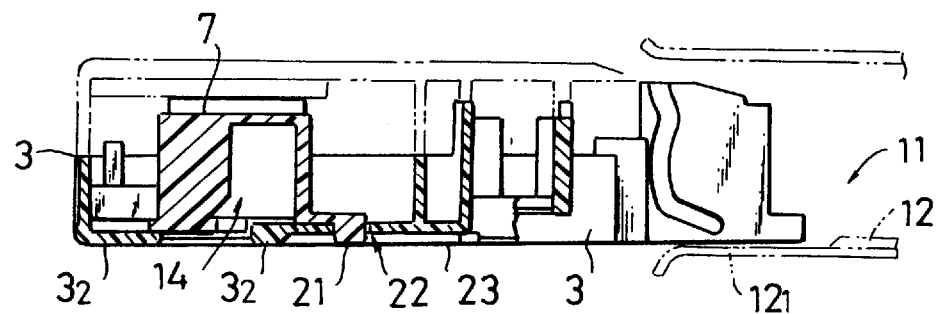
FIG. 15 is a vertical sectional view taken along line 15—15 of FIG. 14.
Figure 16:
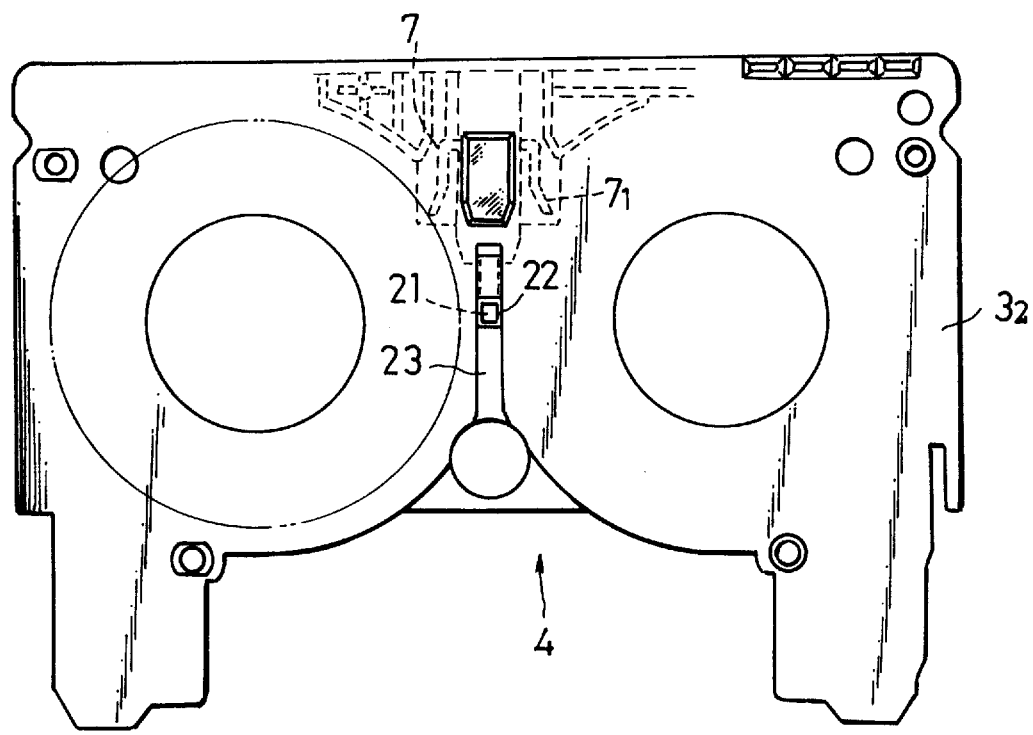
FIG. 16 is a bottom view of the lower casing member shown in FIG. 13.
Figure 17:
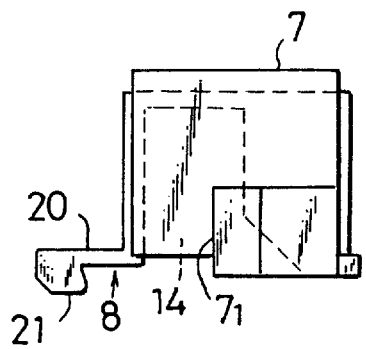
FIGS. 17, 18 and 19 are a side elevation view, a rear view and a bottom view of a lock member to be incorporated in the modification of FIG. 13, respectively.
Figure 18:
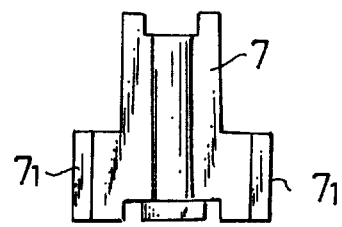
Figure 19:
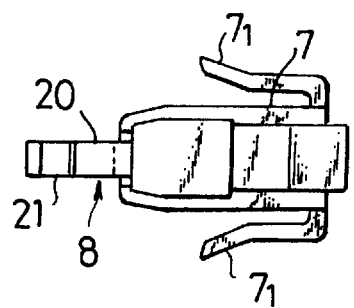
Figure 20:
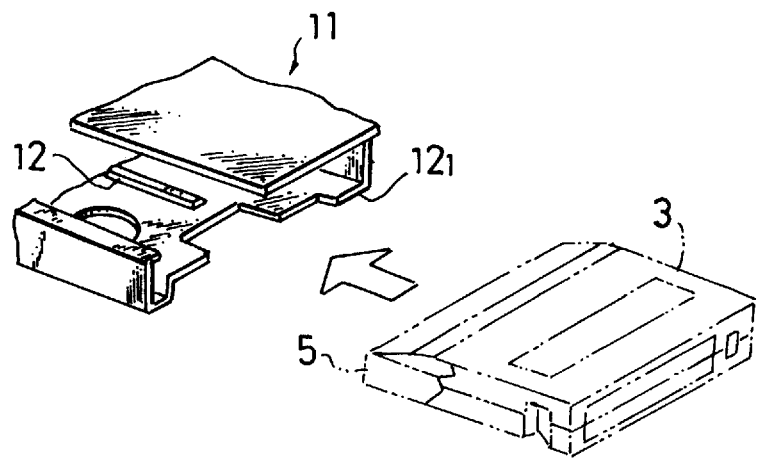
FIG. 20 is a fragmentary perspective view showing a part of a recording and reproducing apparatus which is adapted to be charged therein with another example of a tape cassette of the present invention.

Also, in the embodiment described above, it is desirable that the recording and reproducing apparatus 11 which is charged therein with the tape cassette including the casing 3 having a pair of the tape reels 2 having a tape-like medium wound thereon rotatably received therein, the reel brake member 7 engaged with the reels 2 to brake rotation of the tape reels in non-use of the tape cassette and the rock member 8 for regulating movement of the reel brake member 7 is constructed so as to provide the regulation release member 12 for releasing regulation of the lock member 8 as shown in FIGS. 15 and 20, to thereby conform to the lock mechanism of the reel brake member 7 of the tape cassette. This is accomplished, for example, by providing a cassette holder $12_1$ with a projection for pushing up the brake. Alternatively, the recording and reproducing apparatus may be desirably constructed so as to release the lock member 8 by the regulation release means 12 arranged at a top of the reel brake release means 13, as shown in FIGS. 3 and 9.

As can be seen from the foregoing, the illustrated embodiment is so constructed that the lock member is provided with the holding means and arranged at one of the reel brake member and casing for selectively regulating movement of the reel brake member in the brake release direction, the holding means of the lock member is detachably engaged with the engagement means of the casing, and the lock member is actuated by the regulation release means of the recording and reproducing apparatus or the brake release means of the apparatus. Thus, in non-use of the tape cassette, the reel brake member urged so as to be engaged with the tape reels by elastic force is kept fixed by the lock member for preventing movement of the reel brake member in a direction in which the reel brake member is released from engagement with the tape reels. Thus, the lock member is elastically urged in a direction of locking the reel brake member and heldly engaged with the casing to keep the reel brake member locked. Thus, such construction of the illustrated embodiment, even when increased shock due to dropping of the tape cassette or the like is applied to the tape cassette in non-use of the tape cassette, effectively keeps the reel brake member from being released from engagement with the tape reels to prevent sagging of the tape, to thereby ensure positive and safe charging of the tape cassette in the recording and reproducing apparatus. In use of the tape cassette, the reel brake lock mechanism releases lock of the reel brake member from engagement with the tape reels prior to reel brake release operation, resulting in safe traveling of the tape being ensured.

Referring now to FIGS. 24 to 38, another embodiment of a tape cassette according to the present invention is illustrated. In a tape cassette of the illustrated embodiment, a reel brake member 7 includes brake pawls $7_1$ selectively engaged with indentations $2_1$ provided on an outer periphery of a flange of each of tape reels 2 and a reel brake release actuation section 40 exposed from a through-hole 42 formed at a casing 3. The indentations $2_1$ may be provided in the form of teeth of a gear. A lock member 8 includes holding sections 9 for regulating movement of the reel brake member 7 in a brake release direction. The lock member 8 is arranged so as to be movable while keeping each of the brake pawls $7_1$ engaged with the indentations $2_1$ of the tape reel 2. More particularly, in FIG. 25, the brake pawls $7_1$ are each engaged with the indentations $2_1$ of the tape reel 2, to thereby be moved to a position indicated at phantom lines, resulting in the reel brake member 7 being moved in a left-hand direction. The lock member 8 is so arranged that the holding sections 9 are engaged with engagements 10 of the casing 3 within a range of a distance of such movement of the reel brake member 7. Thus, the engagements 10 are each arranged at a position spaced by a distance by which each of the brake pawls $7_1$ are movable while being engaged with the indentations $2_1$ of each of the tape reels 2. The lock member 8 is actuated by a brake release means 13 of a recording and reproducing apparatus 11 such as a cam rod and permits the reel brake member 7 to be moved so long as the brake pawls are kept from being released from the indentations $2_1$ due to shock applied thereto in non-use of the tape cassette.

The reel brake release actuation section 40 is formed with an inclined surface 44, which is arranged in proximity to the through-hole 42 of the casing 3 via which the brake release means 13 of the recording and reproducing apparatus 11 is inserted into the casing 3. The lock member 8 includes a lock release actuation section 46 arranged so as to cover the inclined surface 44 of the reel brake member 7 and is arranged so as to be moved close to and away from the reel brake member 7. Thus, insertion of the brake release means 13 via the through-hole 42 of casing 3 causes the brake release means 13 of the apparatus 11 to move the lock member 8, so that the reel brake member 7 may be smoothly slid in the brake release direction between a pair of guide elements 48 and between guide ribs 50 formed on an inner surface of an upper casing member 31 so as to downwardly extend therefrom.

The brake pawls $7_1$ of the reel brake member 7 are each formed so as to exhibit elastic deformation through a thin-wall elastic hinge section 52 formed of an elongated recessed element 54. The brake pawls $7_1$ thus constructed are each constantly urged toward in a direction in which it is engaged with the indentations $2_1$ of the tape reel 2. Thus, when shock due to dropping of the tape cassette is applied thereto during non-use of the tape cassette, resulting in force due to a weight of the tape reels 2 being applied to the reel brake member 7 in a brake release direction, the thin-wall hinge sections 52 of the brake pawls $7_1$ of the brake member 7 absorb the shock to reduce force acting on the reel brake member 7.

Figure 25:
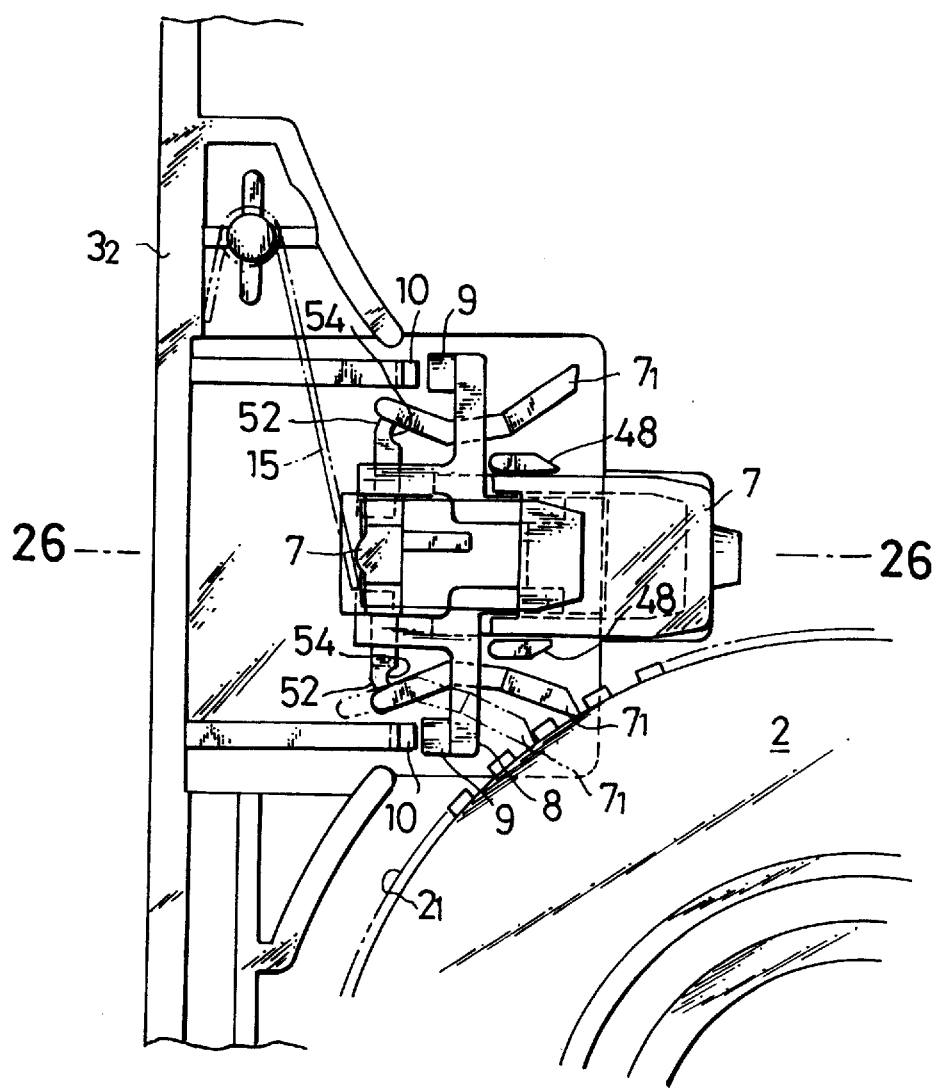
FIG. 25 is a fragmentary enlarged plan view showing an essential part of the tape cassette of FIG. 24.
Figure 26:
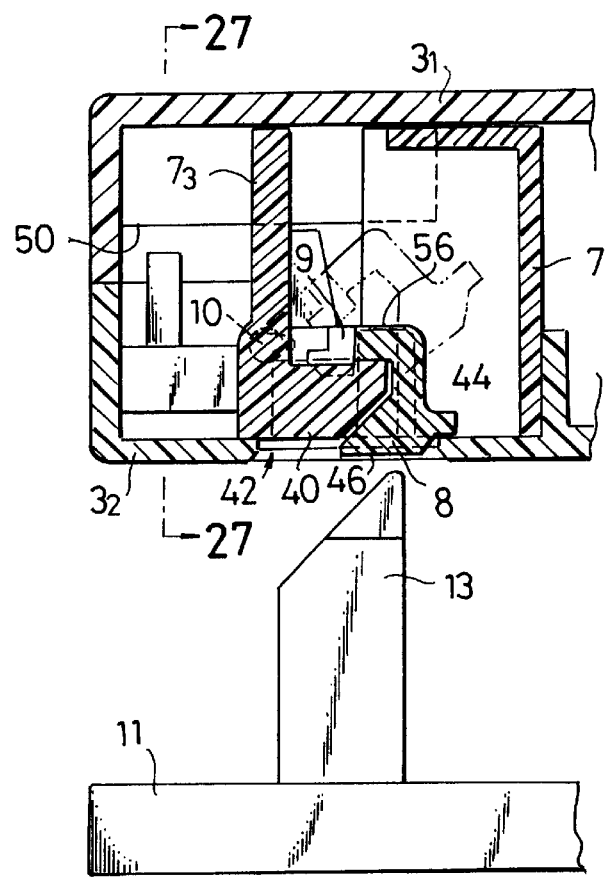
FIG. 26 is a vertical sectional view taken along line 26—26 of FIG. 25.
Figure 27:
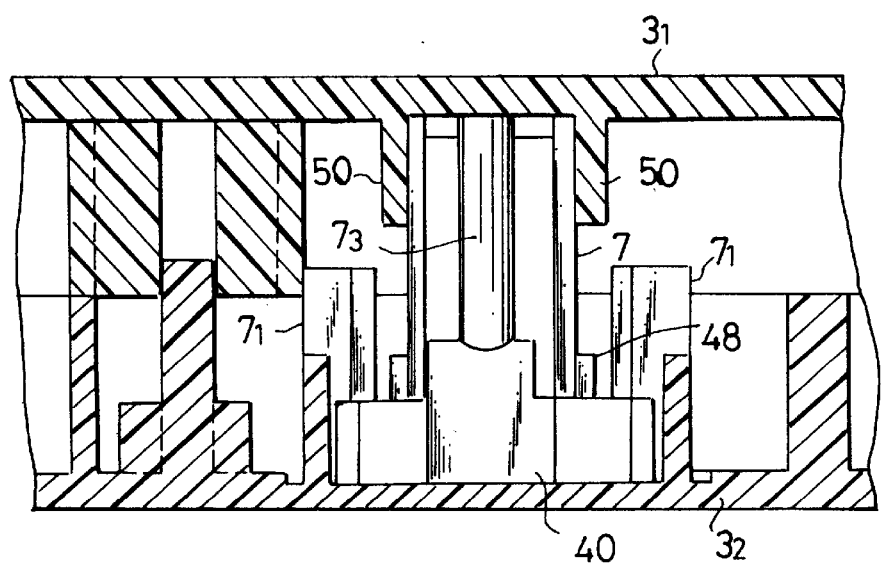
FIG. 27 is a vertical sectional view taken along line 27—27 of FIG. 26.
Figure 28A:
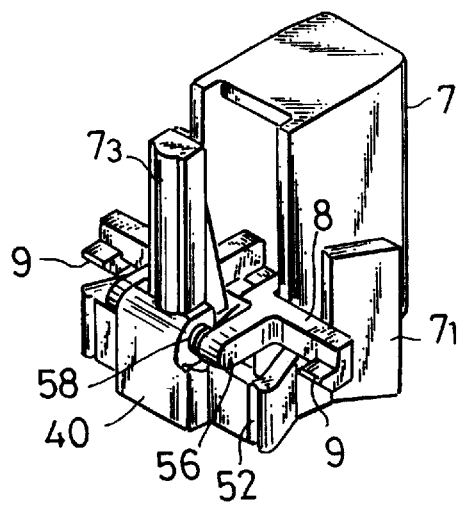
FIG. 28A is a rear perspective view showing arrangement of a reel brake member and a lock member wherein the reel brake member is kept locked.
Figure 28B:
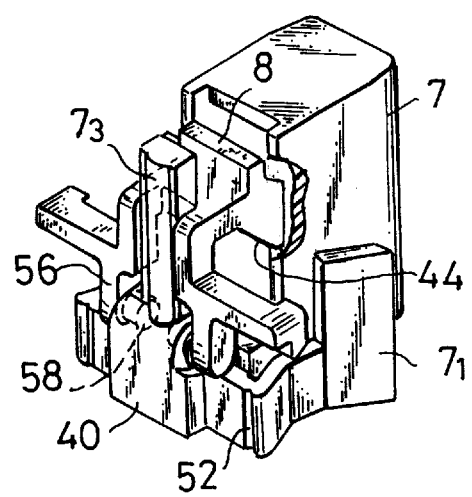
FIG. 28B is a rear perspective view showing arrangement of the reel brake member and lock member wherein locking of the reel brake member is released.
Figure 29A:
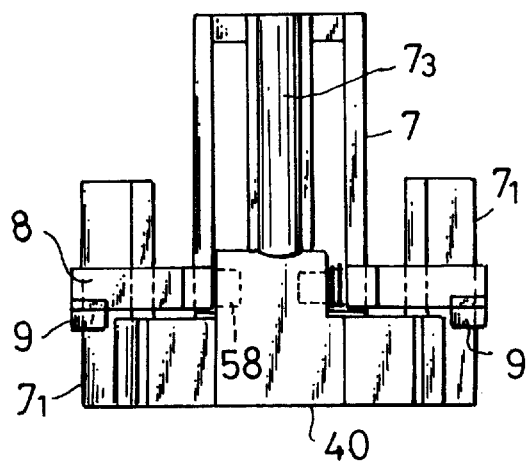
FIG. 29A is a rear elevation view of the reel brake member and lock member shown in FIGS. 28A and 28B wherein the reel brake member is kept locked.
Figure 29B:
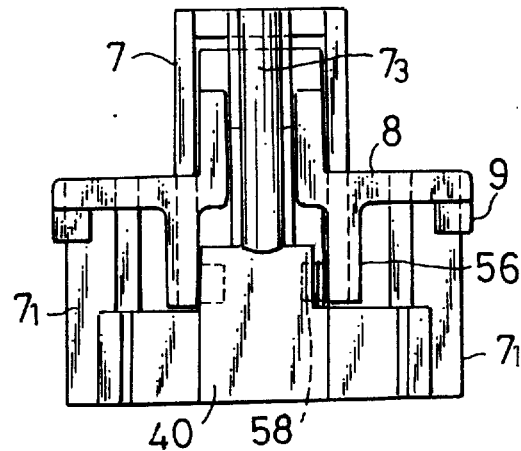
FIG. 29B is a rear elevation view of the reel brake member and lock member shown in FIGS. 28A and 28B wherein locking of the reel brake member is released.
Figure 30:
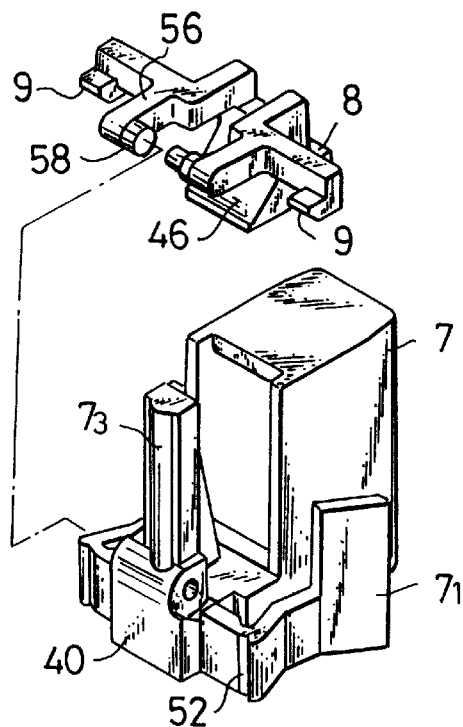
FIG. 30 is an exploded rear perspective view showing the reel brake member and lock member shown in FIGS. 28A and 28B.
Figure 31:
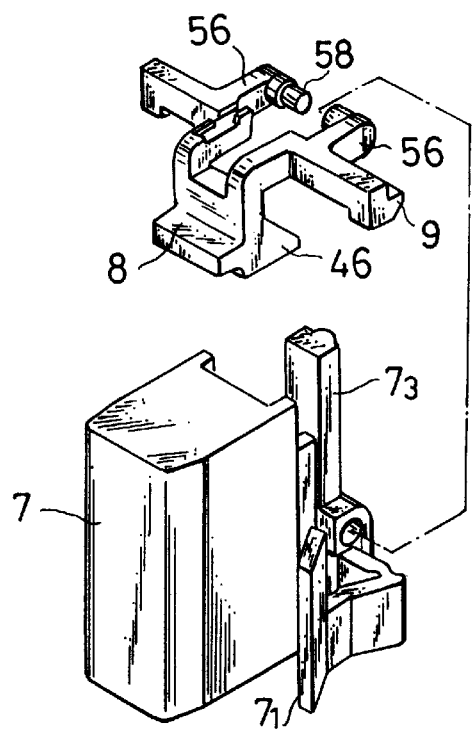
FIG. 31 is an exploded front perspective view of the reel brake member and lock member shown in FIG. 30.

When the reel brake member 7 is moved due to shock applied thereto, the brake pawls $7_1$ are each outwardly expanded by elastic restoring force while being kept engaged with the indentations $2_1$ of each of the tape reels 2, as indicated at phantom lines in FIG. 25, and the engagements 10 of the casing 3 are kept engaged with the holding sections 9 of the lock member 8; so that the movement of the reel brake member 7 may be restricted. However, normally, the brake pawls $7_1$ are each engaged with the indentations $2_1$ of the tape reel 2 and the holding sections 9 of the lock member 8 are kept from being engaged with the engagements of the casing 3.

The lock member 8 for restricting and regulating movement of the reel brake member 7 is engaged with the brake release means 13 of the recording and reproducing apparatus 11 to move the reel brake member in a regulation release direction against a spring 18 and separate the holding sections 9 of the lock member 8 from the engagements 10 of the casing 3, resulting in being disengaged from the casing 3. As shown in FIGS. 25 to 35F, the lock member 8 is pivotally supported through brackets 56 on the reel brake member 7 by means of support pins 58 and is fitted on a rod 73 acting as a spring stopper while being urged by the spring 19 in a direction of holding the reel brake member 7.

Figure 32:
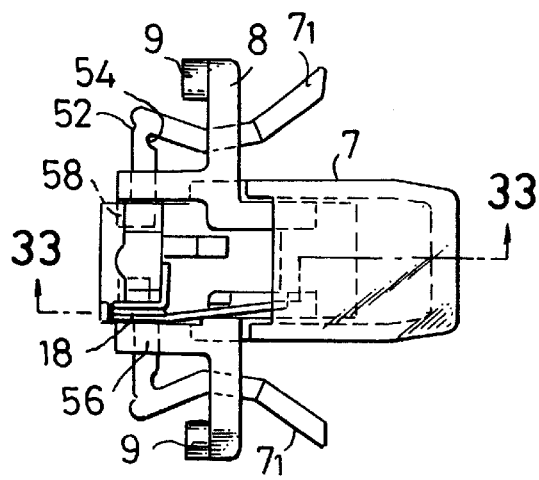
FIG. 32 is a plan view showing operation of the reel brake member and lock member shown of FIG. 30.
Figure 33A:
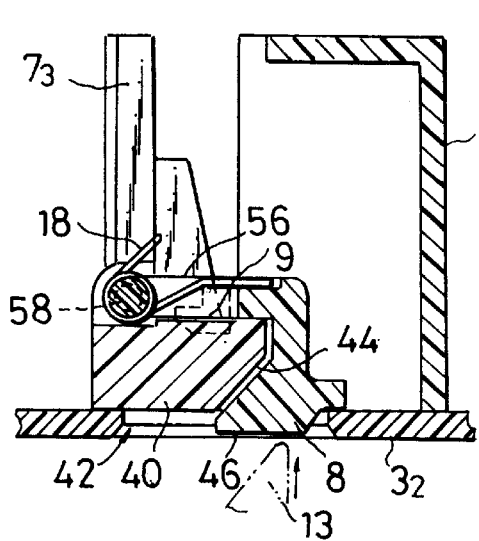
FIG. 33A is a vertical sectional view taken along line 33—33 of FIG. 32.

More particularly, as shown in FIGS. 32 and 33A, the lock member 8 includes the above-described lock release actuation section 46 vertically pivotally mounted in the reel brake member 7 and exposed through the through-hole 42 of the casing 3 and the brackets 56 and support pins 58 each arranged so as to extend from the actuation section 46. Also, in the lock member 8, as shown in FIG. 33A, the lock release actuation section 46 is arranged in proximity to the through-hole 42 of the casing 3 so as to cover the inclined surface 44 of the reel brake release actuation section 40, resulting in being readily pushed up for pivotal movement by the brake release means 13.

In the illustrated embodiment, the lock member 8 is arranged on the reel brake member 7. Alternatively, it may be arranged on the casing 3, for example, through a support member (not shown) projectedly provided on the casing 3.

Figure 33B:
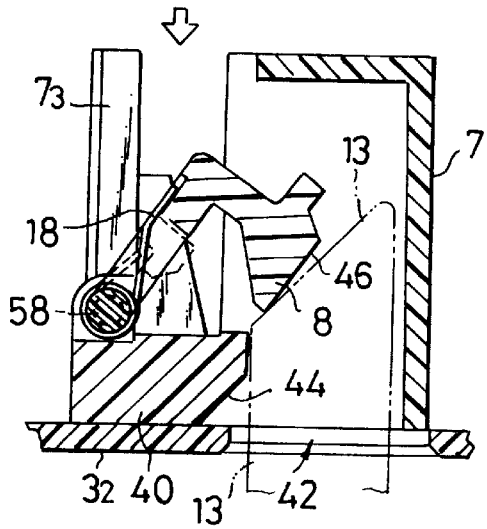
FIG. 33B is a vertical sectional view similar to FIGS. 33A wherein the lock member is actuated by a recording and reproducing apparatus.
Figure 34:
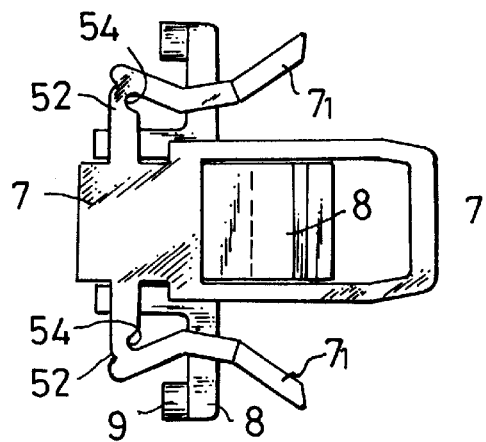
FIG. 34 is a bottom view of the reel brake member and lock member shown in FIG. 30.
Figure 35A:
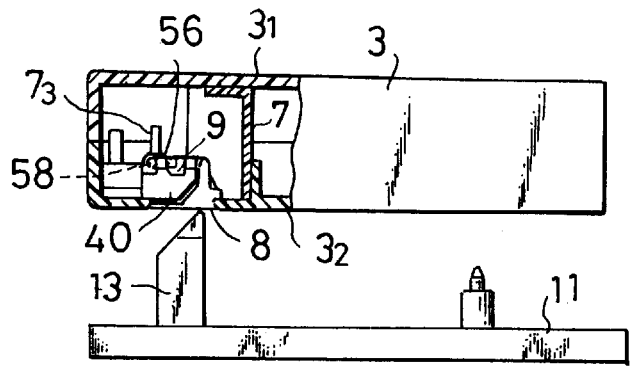
FIGS. 35A to 35F are each a side elevation view partly in section showing a manner of operation of the tape cassette shown in FIG. 24.
Figure 35B:
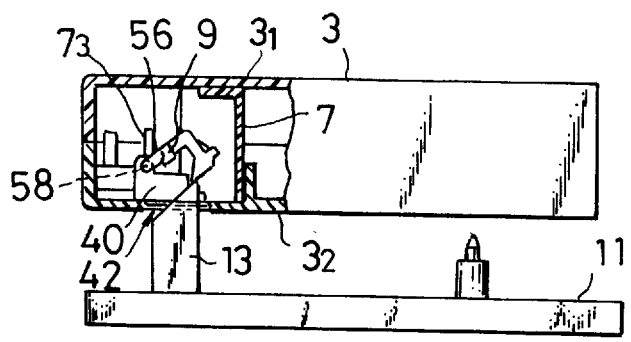
Figure 35C:
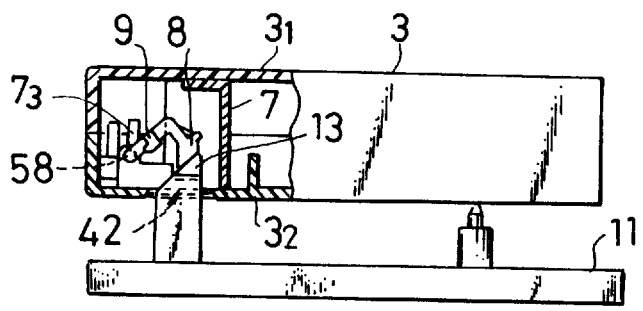
Figure 35D:
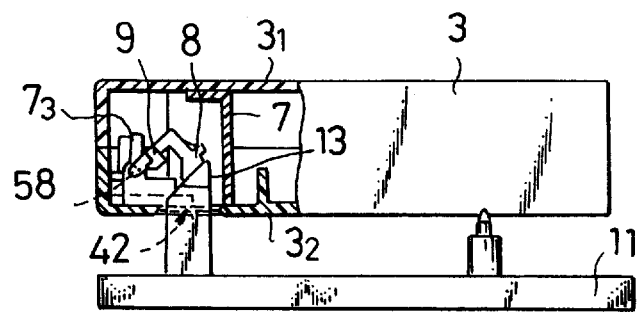
Figure 35E:
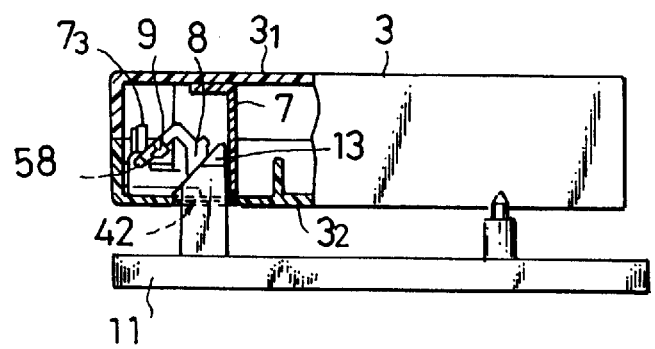
Figure 35F:
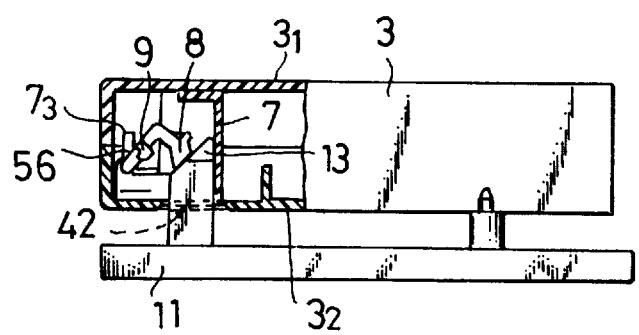
Figure 36:
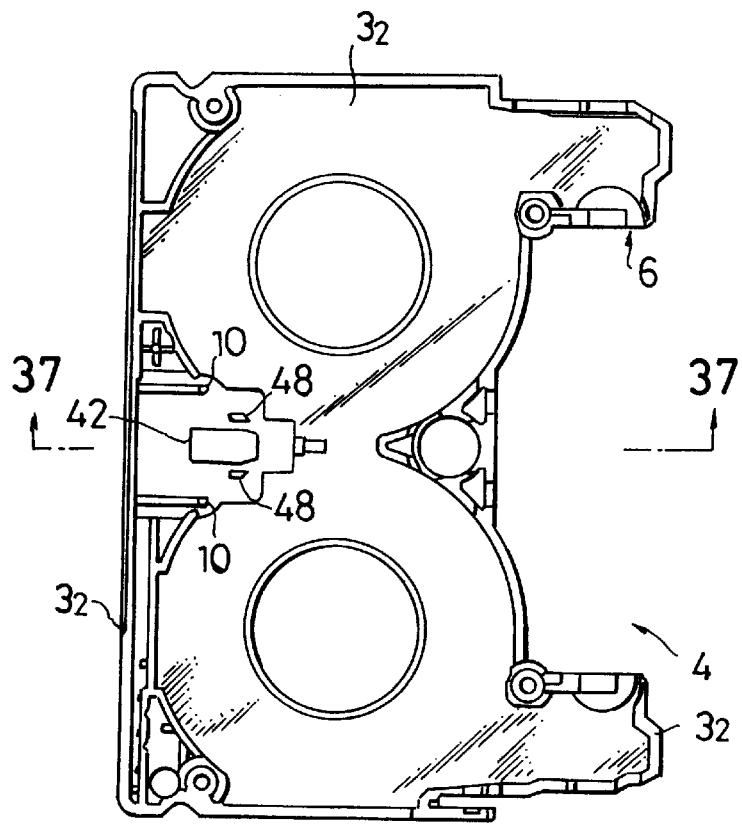
FIG. 36 is a plan view showing a lower casing member.
Figure 37:
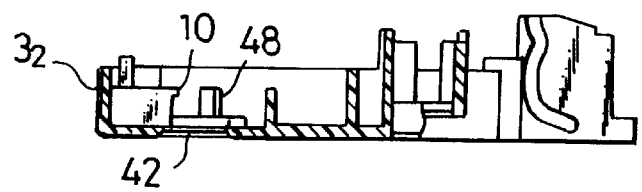
FIG. 37 is a vertical sectional view taken along line 37—37 of FIG. 36.
Figure 38:
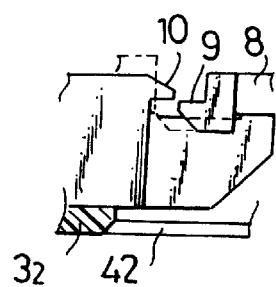
FIG. 38 is a fragmentary enlarged side elevation view partly in section showing engagement between the lock member and lower casing member of FIG. 36.

FIGS. 35A to 35F show operation of the tape cassette of the illustrated embodiment, wherein the brake release means 13 is inserted via the through-hole 42 of the casing 3 to release the lock member 8, resulting in the reel brake member 7 being moved in a brake release direction. When the lock member 8 is incorporated in the reel brake member 7, arrangement of the spring 18 is preferably carried out as shown in FIG. 33B as well as FIGS. 32 and 33A. More particularly, the spring 18 is fitted at a coiled portion thereof on the support pin 58, resulting in being fitted in a pin hole as shown in FIG. 33B and then the lock member 8 is pivotally moved to engage one end of the spring 18 with the rod $7^3$ and abut the other end of the spring 18 against a rear portion of the lock member 8, so that the lock release actuation section 46 may cover the inclined surface 44 of the reel brake release action section 40.

The remaining part of the illustrated embodiment may be constructed in substantially the same manner as the embodiment described above with reference to FIG. 1.

Figure 24:
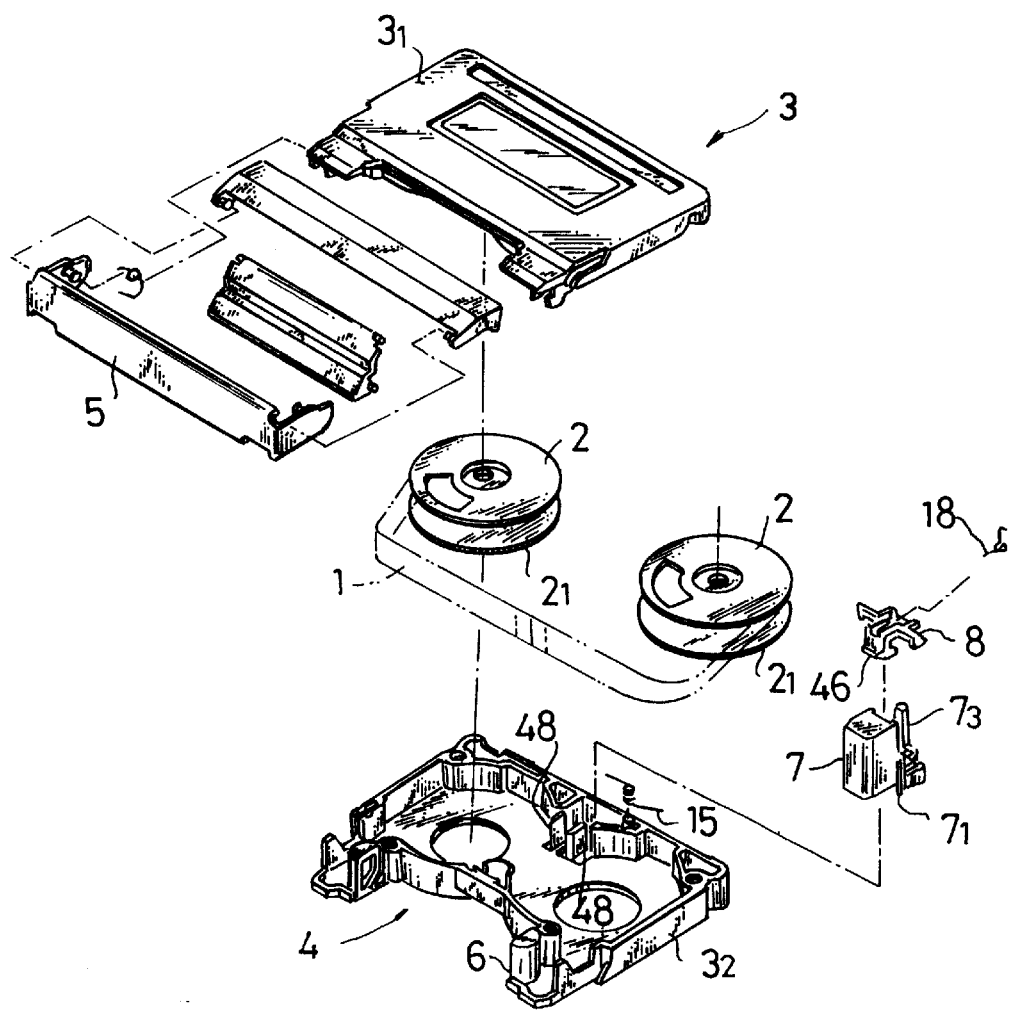
FIG. 24 is an exploded perspective view showing another embodiment of a tape cassette according to the present invention.
Figure 39:
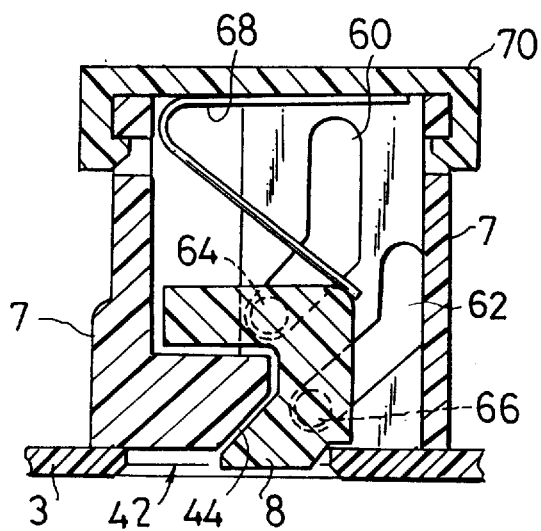
FIG. 39 is a fragmentary vertical sectional view showing a modification of the tape cassette of FIG. 24.
Figure 40:
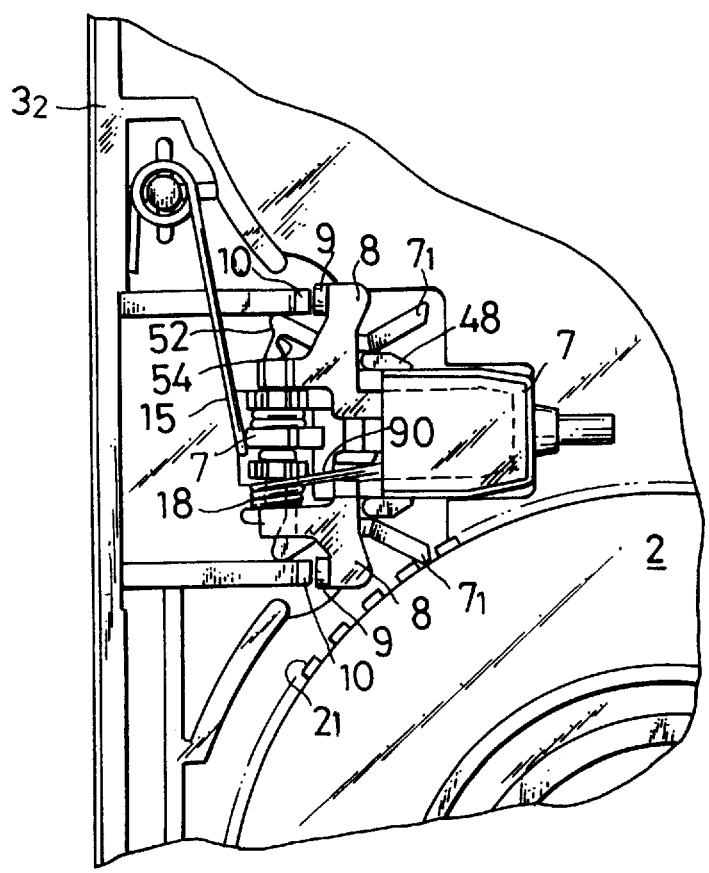
FIG. 40 is a fragmentary enlarged plan view showing an essential part of a further embodiment of a tape cassette according to the present invention.
Figure 41:
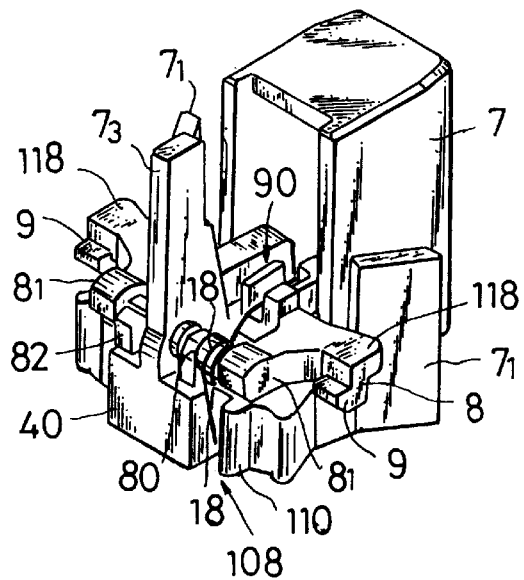
FIG. 41 is a perspective view showing arrangement of a reel brake member and a lock member combined with each other.

Referring now to FIG. 39, a modification of the tape cassette of FIG. 24 is illustrated. In a tape cassette of the modification, a lock member 8 is constructed into a slide-type structure. A reel brake member 7 is formed on an inner surface thereof with cam grooves 60 and 62 and the lock member 8 is provided thereon with projections 64 and 66 for slide guide fitted in the cam grooves 60 and 62, respectively. In a lock state, the cam grooves 60 and 62 cause the lock member 8 to be positioned so as to cover an inclined surface 44 of the brake member 7. Lock release operation causes the lock member 8 to be obliquely upwardly moved along the inclined surface 44 and then vertically slid.

A spring 68 for forcing the lock member 8 is heldly engaged at one end thereof with the lock member 8 and at the other end thereof with a cover 70 for the reel brake member 7. In the modification, the lock member 8 is guided by the reel brake member 7 while being slid thereon. Alternatively, a casing may be provided with a slide guide means (not shown) such as a cam groove, resulting in the lock member being guided by the casing.

As will be noted from the foregoing, the embodiment shown in FIGS. 24 to 39 is so constructed that in non-use of the tape cassette, the lock member permits movement of the reel brake member while keeping the brake pawls engaged with the indentations of the tape reels and restricts movement of the reel brake member within a range which keeps the brake paws from being disengaged from the tape reels due to abutment of the holding sections of the lock member against the engagements of the casing. Such construction, when shock due to dropping of the tape cassette or the like is applied thereto, permits the reel brake member to be moved in the brake release direction within a range which keeps the brake pawls from being disengaged from the engagements of the casing and permits the reel brake member to absorb the shock. Also, the lock member prevents further movement of the reel brake member. Thus, it will be noted that the illustrated embodiment permits the reel brake member to positively exhibit a satisfactory brake function in non-use of the tape cassette.

Also, the illustrated embodiment permits the lock member of reduced elastic force to be used for this purpose, so that brake release operation for actuation of the tape cassette may be facilitated.

Further, the illustrated embodiment is so constructed that the brake release actuation section of the reel brake member includes the inclined surface arranged in proximity to the through-hole of the casing and adapted to be abutted against the brake release means of the recording and reproducing apparatus and the lock release actuation section of the lock member is arranged so as to be moved close to and away from the inclined surface of the reel brake member. Such construction permits the tape cassette of the illustrated embodiment to be conveniently applied to a conventional recording and reproducing apparatus free of a brake lock mechanism.

Referring further to FIGS. 40 to 54, a further embodiment of a tape cassette according to the present invention is illustrated. A tape cassette of the illustrated embodiment is so constructed that a lock member 8 is pivotally supported through support pins 80 on a pivotal support section 82 of a reel brake member 7 and includes holding sections 9 detachably engaged with engagements 10 provided at a casing 3.

The reel brake member 7 includes a reel brake release actuation section 40 provided with an inclined surface 44, which is arranged in proximity to a through-hole 42 of the casing and adapted to be abutted against a brake release means 13 of a recording and reproducing apparatus. Correspondingly, the lock member 8 includes a lock release actuation section 46 arranged so as to be moved close to and away from the inclined surface 44 of the reel brake member 7. The lock member 8 is so constructed that an edge 84 of the lock release actuation section 46 facing or on a side of the support pins 80 and an edge 86 of each of the holding sections 9 facing or on a side of the lock release actuation section 46 are positioned on the same plane p. Such construction of the lock member 8 highly simplifies a mold for forming the tape cassette, to thereby contribute to mass production of the tape cassette.

Figure 44:
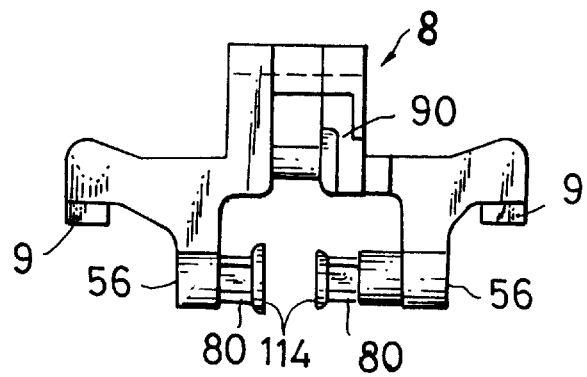
FIG. 44 is a plan view showing the lock member.
Figure 45:
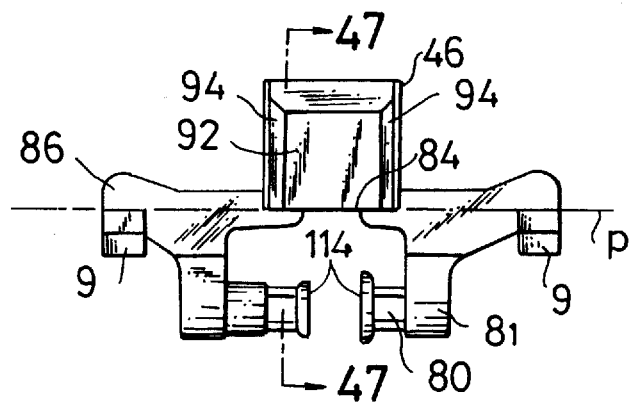
FIG. 45 is a bottom view showing the lock member.
Figure 46:
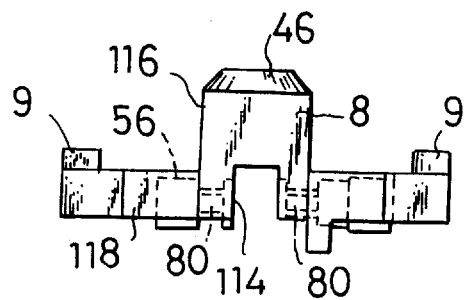
FIG. 46 is a plan view showing the lock member.
Figure 47:
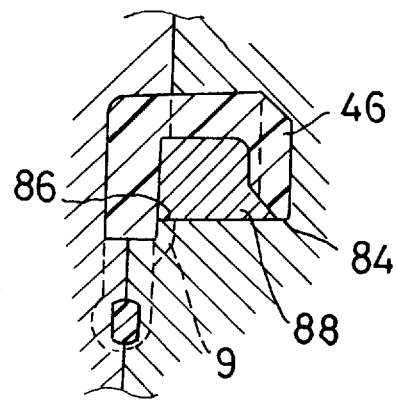
FIG. 47 is a sectional view taken along line 47—47 of FIG. 45 which shows the lock member arranged in a mold.

More particularly, as shown in FIGS. 44, 45 and 47, the construction of the lock member that the edge 84 of the lock release actuation section 46 facing the support pins 80 and the edge 86 of each of the holding sections 9 facing the lock release actuation section 46 are positioned on the same plane p reduces an undercut in formation of a mold for the lock member, so that a member for forming an undercut which is called a slide core 88 is merely required to slide in only one direction, resulting in a mold for forming the lock member being simplified in structure.

For the purpose of mounting the thus-constructed lock member 8 on the reel brake member 7, the lock member 8 includes a pair of brackets 56, each of which is provided thereon with the above-described support pin 80 in a manner to be projected therefrom. The support pins 80 each are supported so as to be rotatable in a hole of each of the pivotal support sections 82. The lock member 8 is urged in a lock direction by a torsion spring 18. The torsion spring 18 includes a coil portion 96 fitted on one of the support pins 80 and is held at one end 98 thereof on a first spring receiving recess 90 and at the other end 100 thereof on a second spring receiving recess 108 formed between a projection 110 formed at a connection of the reel brake release actuation section 40 with the brake pawls $7_1$ and a side surface of the reel brake release actuation section 40.

More particularly, the illustrated embodiment is constructed in such a manner that the support pins 80 of the lock member 8, as shown in FIGS. 42, 43, 48A and 48B, each have a width-reduced or diameter-reduced flat portion 102 by partially removing an outer peripheral surface of the support pin 80 and a round portion 104 other than the width-reduced portion 102. Correspondingly, the support sections 26 are each formed with an opening 106 through which the width-reduced portion 102 of the support pin 80 is inserted into a hole 112. For this purpose, the opening 106 is formed with a width equal to or smaller than a width of the flat portion 102. The coil portion 96 of the torsion spring 18 is fitted on the support pin 80 of the lock member 8. Also, the spring 18 is held at one end 98 thereof on the first spring receiving recess 90. Then, the lock member 8 is turned by about 90 degrees from a lock position and the other end 100 of the spring 19 is raised up and held in the second spring receiving recess 108 formed between the projection 110 formed at the connection of the reel brake release actuation section 40 with the brake pawls $7_1$ and the side surface of the reel brake release actuation section 40. Concurrently or subsequently, the width-reduced portion 102 of the support pin 80 is fitted in the hole 112 through the opening 106, followed by rotation of the lock member by 90 degrees, resulting in the lock member 8 being pivotally connected to the reel brake member 7 while keeping the round portion of the support pin 80 facing the opening 106. When the opening is formed into a width smaller than that of the width-reduced portion 102, the support section 82 may be subject to elastic deformation for the insertion.

Figure 42:
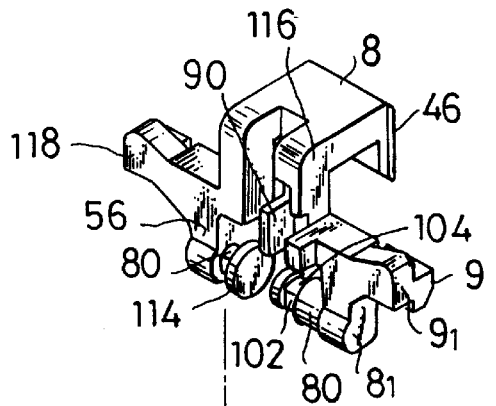
FIG. 42 is an exploded perspective view showing the reel brake member and lock member separated from each other.
Figure 42:
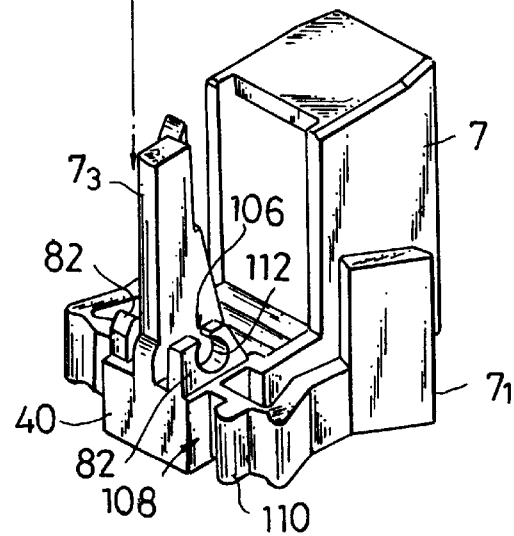
Figure 43:
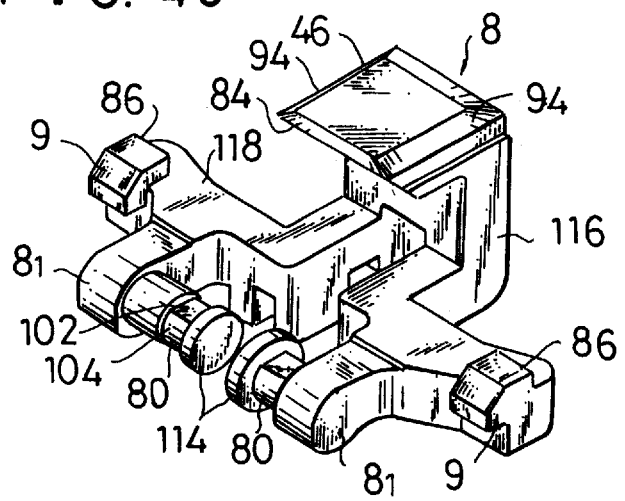
FIG. 43 is a bottom perspective view showing the lock member.
Figure 48A:
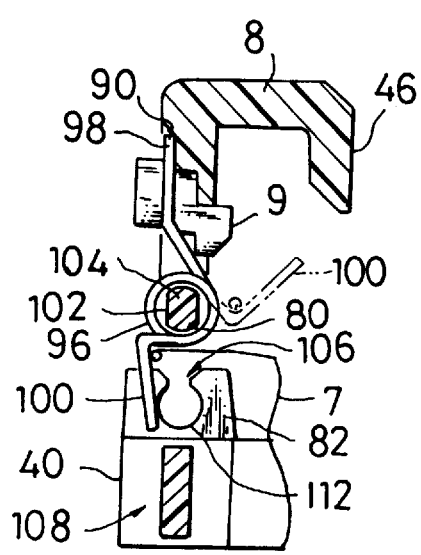
FIG. 48A is a vertical sectional view showing the reel brake member and lock member prior to assembling.
Figure 48B:
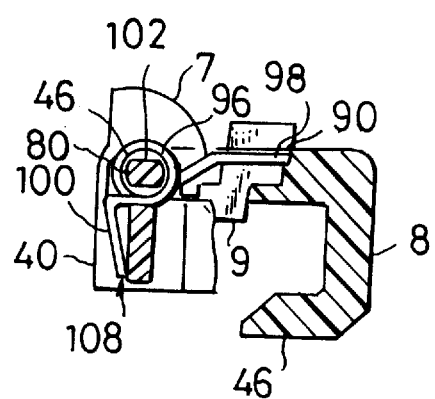
FIG. 48B is a vertical sectional view showing the reel brake member and lock member assembled together.
Figure 49:
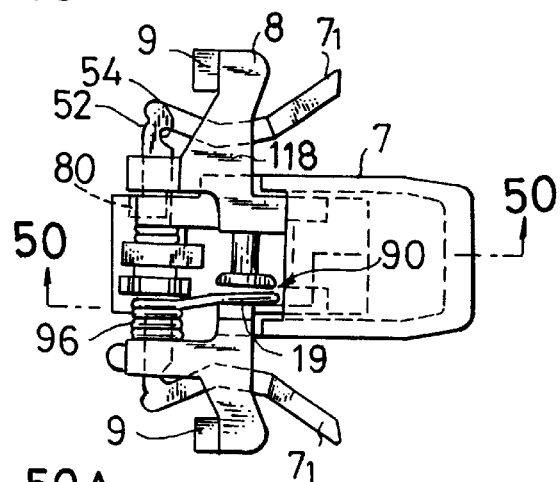
FIG. 49 is a plan view showing the reel brake member and lock member assembled together.
Figure 50A:
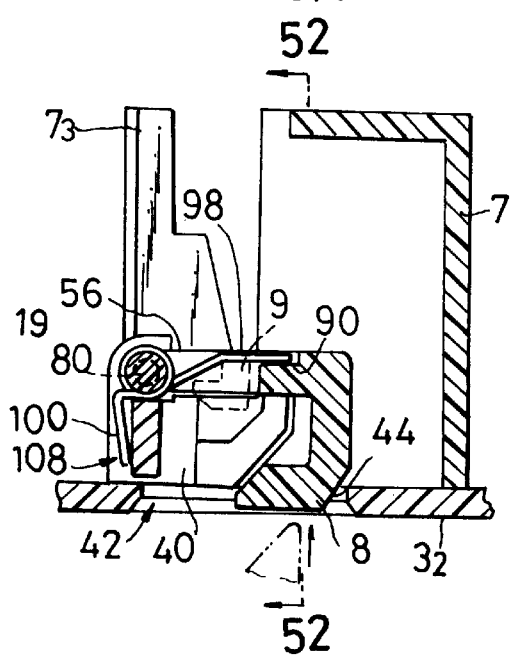
FIG. 50A is a vertical sectional view taken along line 50—50 of FIG. 49.
Figure 50B:
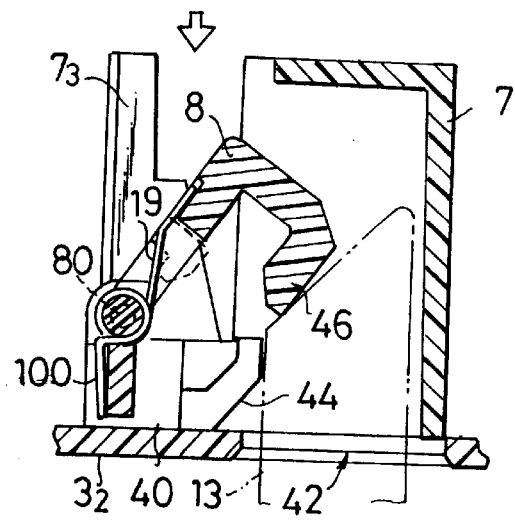
FIG. 50B is a vertical sectional view similar to FIG. 50A and showing the reel brake member and lock member in use of a tape cassette in a recording and reproducing apparatus.
Figure 51:
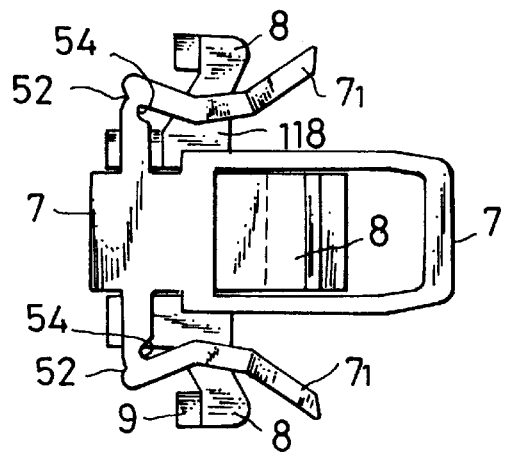
FIG. 51 is a bottom view showing the reel brake member and lock member combined with each other.
Figure 52:
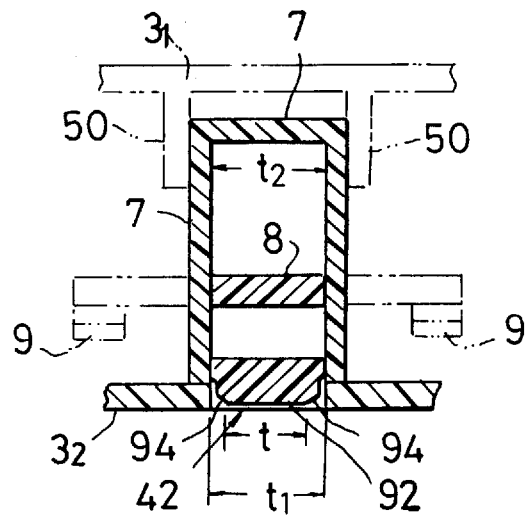
FIG. 52 is an enlarged vertical sectional view showing an essential part of the reel brake member and lock member combined with each other.
Figure 53:
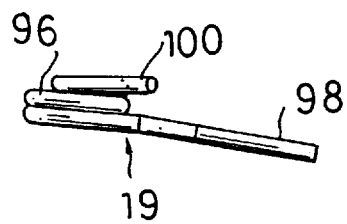
FIG. 53 is a plan view showing a torsion spring.
Figure 54:
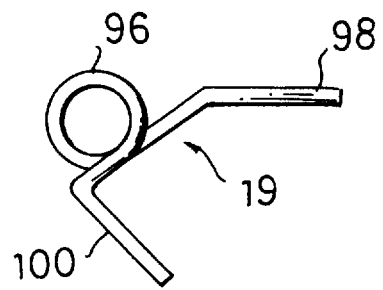
FIG. 54 is a side elevation view showing the torsion spring.

Thus, as shown in FIGS. 42, 48A and 48B, when the lock member 8 is downwardly incorporated into the reel brake member 7 while keeping the lock member 8 turned by about 90 degrees from the lock position, the width-reduced portion 102 faces in a lateral direction, so that the support pin 80 may be smoothly inserted into the hole 112 (FIG. 48A). When the lock member 8 is turned to the lock position as shown in FIG. 48B, the flat portion 102 of the support pin 80 faces in a vertical direction, resulting in preventing release of the support pin 80 from the hole 112. The other end 100 of the spring 18 is preferably incorporated while being kept twisted rearwardly of the connection of the reel brake member 7.

The support pins 80 of the lock member 8 may each be provided on a distal end thereof with a flange 114. Positioning of the flange 114 inside the support section 82 effectively prevents slide guides 116 and arms 118 from being deformed even when external force is applied to the lock member 8, so that pivotal movement of the lock member 8 and operation of the lock member in the lock position may be smoothly accomplished. Also, this positively prevents disconnection of the lock member from the reel brake member 7.

The lock release actuation section 46 of the lock member 8 is so formed that a width t of a bottom surface 92 thereof is smaller than a width $t_1$ of the through-hole 42 of a lower casing member $3_1$ of the casing 3. Also, the bottom surface 92 of the lock release actuation section 46 is positioned within the through-hole 42 in a thickness direction of a bottom plate of the lower casing member $3_1$ when the lock member is in a lock position. Such construction of the lock release actuation section 46 permits it to be immediately abutted against the brake release means of the recording and reproducing apparatus, so that the lock member may be increased in angle of rotation prior to movement of the reel brake member. This permits displacement of the lock member to be increased, resulting in locking and unlocking being accurately accomplished.

Also, the lock release actuation section 46 of the lock member 8 is so formed that the bottom surface 92 is chamfered at each of both side edges to provide an inclination 94 such as, for example, a taper or the like, resulting in a dimension thereof being coincident with a movement-permissible dimension $t_2$ defined in the reel brake member 7. This permits the lock release actuation section 46 to be smoothly slid along inner surfaces of the reel brake member.

The torsion spring 18, as described above, is so arranged that the coil portion 96 thereof is fitted on the support pin 80 and one end thereof is held in the first spring receiving recess 90. The other end of the spring 19 is raised while keeping the lock member 8 turned by about 90 degrees from a lock position and then held at the other end thereof in the second spring receiving recess formed between the projection formed at the connection of the reel brake release actuation section 40 of the reel brake member 7 with the brake pawls $7_1$ and a side surface of the reel brake release actuation section 40. Concurrently or subsequently, the support pins 80 each are inserted at the width-reduced portion thereof through the opening 106 of the support section 26 of the reel brake member 7 thereinto and then the lock member 8 is turned by 90 degrees. Thus, the lock member 8 is pivotally connected to the reel brake member 7.

The above-described construction of the illustrated embodiment, even when shock due to dropping of the tape cassette or the like is applied to the tape cassette in non-use thereof, effectively keeps the reel brake member from being released from engagement with the tape reels to prevent sagging of the tape, to thereby ensure positive and safe charging of the tape cassette in the recording and reproducing apparatus. Also, the illustrated embodiment reduces an undercut when a mold for forming the lock member is manufactured, so that a slide core is merely required to slide in only one direction, resulting in the mold for forming the lock member being simplified in structure.

In the embodiments described above, the reel brake member may be made of a material different from that of said lock member. For example, the reel brake member may be made a composite material consisting of a base component and an additive added thereto. The base material of the base component may be selected from a group consisting of polyacetal resin(POM) and polypropylene resin(PP). An elastomer such as butadiene rubber may be used as the additive. The additive may be added in an amount of 5 to 30 wt %. The composite material may have a lubricant such as silicon, silicone or the like added thereto in an amount of 1 to 10 wt %. Formation of the composite material into the reel brake member 7, even when the casing 3 is made of ABS resin, permits the reel brake member 7 to be smoothly moved in the casing. Also, this permits elastic deformation of the member 7, resulting in it exhibiting a shock absorbing function.

The lock member 8 may be made of a material selected from a group consisting of polyacetal resin, polycarbonate resin, and a composite material formed by mixing polyacetal resin or polycarbonate resin with an inorganic additive such as glass fiber, calcium carbonate or the like. The additive may be added in an amount of 3 to 20 wt %. Formation of such a material into the lock member 8 effectively prevents deformation of the lock member and disengagement of the reel brake member from the lock member. Also, addition of the additive increases rigidity of the lock member and prevents production of dust or the like due to abrasion, leading to an improvement in reliability.

The amount of addition of the elastomer, lubricant and the like were determined on the basis of results of examples carried out by the inventors. The results are as shown in the following table.

| Example | Reel Brake Material | Lock Member Material | Sagging of Tape Charged in VTR (mm) | | | | |
|---|---|---|---|---|---|---|---|
| 1 | POM + A* 10% + B* 2% | POM | 2 | 2 | 3 | 2 | 2 |
| 2 | POM + A 20% + B 2% | POM | 2 | 2 | 2 | 3 | 2 |
| 3 | PP + A 10% + B 2% | POM | 3 | 2 | 5 | 3 | 4 |
| 4 | POM + A 5% + B 1% | POM | 3 | 2 | 3 | 2 | 2 |
| 5 | POM + A 30% + B 5% | POM | 3 | 3 | 2 | 2 | 3 |
| CE* 1 | POM | POM | 3 | 6 | 8 | 4 | 6 |
| CE 2 | PP | POM | 4 | 8 | 8 | 5 | 6 |
| CE 3 | POM + A 10% + B 2% | POM | 2 | 2 | 3 | 2 | 2 |

*A: Elastomer
B: Silicon
CE: Comparative Example

As can be seen from from the results, in Examples 1 to 5, sagging of the tape was reduced and the lock mechanism effectively operated at the time of dropping of the tape cassette. On the contrary, in Comparative Examples 1 and 2, sagging of the tape was disadvantageously increased. In Comparative Example 3, the lock mechanism failed to operate at the time of dropping of the tape cassette.

Also, it was found that incorporation of glass fiber or calcium carbonate in an amount of 3 to 20 wt % into polyacetal resin for formation of the lock member 8 permits the lock member to exhibit flexural elastic modulus as high as 30000 to 45000 kgf/cm$^2$, resulting in being increased in rigidity and resistance to shock.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A tape cassette for use in a recording and reproducing apparatus which includes a brake releasing means, comprising:

a casing having a through-hole for receiving the brake releasing means of the recording and reproducing apparatus;

a pair of tape reels having a tape wound thereon and rotatably received in said casing;

guide means for guiding said tape from any one of said tape reels to the other thereof while being guided along a front portion of said casing and stretched between said tape reels;

said casing being formed with an opening through which said tape is exposed at said front portion of said casing;

a lid for selectively closing said opening;

said casing being formed with tape access ports through which said tape is led out to said front portion of said casing;

a movably mounted reel brake member detachably engaged with said tape reels for selectively preventing rotation of said tape reels;

a lock member movably mounted on said reel brake member and arranged for preventing movement of said reel brake member in a brake release direction during non-use of the tape cassette, said lock member abutting against said brake releasing means when the cassette is charged into the recording and reproducing apparatus;

engagement members provided at said casing for engaging said lock member to prevent said lock member from moving; and holding sections provided at said lock member so as to be detachably engaged with said engagement members of said casing;

said lock member being actuated by engagement with the brake releasing means of the recording and reproducing apparatus to thereby release engagement of said holding sections of said lock member with said engagement members of said casing, thereby enabling movement of said reel brake member.

2. A tape cassette as defined in claim 1, wherein said tape reels each include a flange provided on an outer periphery thereof with indentations; and said reel brake member includes a pair of brake pawls engageable with said indentations of said tape reels, and a brake release actuation section arranged in proximity to said through-hole of said casing and adapted to be abutted against the break release means of the recording and reproducing apparatus.

3. A tape cassette as defined in claim 2, wherein said reel brake member is arranged between said tape reels in a manner to be in proximity to an inner side surface of said casing opposite to said opening.

4. A tape cassette as defined in claim 3, wherein said engagement members are provided at a portion of said casing defined outside of a range of movement of said reel brake member;

said lock member includes a lock release actuation section pivotally supported at a pivotal support section provided on one of said reel brake member and casing and having a portion arranged in proximity to said through-hole of said casing; and said holding sections of said lock member is formed so as to extend from said lock release actuation section.

5. A tape cassette as defined in claim 4, wherein said holding sections of said lock member is urged in a direction of engagement with said engagement members by an elastic member.

6. A tape cassette as defined in claim 3, wherein said engagement members of said casing are provided at a portion of said casing defined outside of a range of movement of said reel brake member;

said lock member includes an actuation section vertically slidably fitted in said reel brake member and including a portion arranged in proximity to said through-hole of said casing;

said holding sections of said lock member are formed so as to extend from said actuation section and urged in a direction of engagement with said engagement means of said casing by an elastic member.

7. A tape cassette as defined in claim 2, wherein said lock member includes a lock release actuation section including a portion arranged in proximity to said through-hole of said casing and support pins through which said lock member is pivotally supported on a pivotal support section provided on said reel brake member; and said lock member is so constructed that an edge of said lock release actuation section of said lock member facing said support pins and an edge of said holding sections of said lock member facing said lock release actuation section are defined on an identical plane.

8. A tape cassette as defined in claim 2, wherein said lock member includes an arm extending from said reel brake member so as to be elastically deformable;

said holding sections of said lock member being arranged at a distal end of said arm;

said engagement members of said casing comprising a hole formed through a lower wall of said casing;

said holding sections of said lock member being detachably fitted in said hole.

9. A tape cassette as defined in claim 2, wherein said through-hole of said casing is formed at a bottom wall of said casing;

said brake release actuation section of said reel brake member has an inclined surface arranged in proximity to said through-hole of said casing and adapted to be abutted against the brake releasing means of the recording and reproducing apparatus; and said lock member includes a lock release actuation section arranged so as to positionally correspond to said inclined surface and be moved close to and away from said inclined surface;

said lock release actuation section having a bottom surface formed with a width smaller than that of said through- hole of said casing;

said bottom surface of said lock release actuation section being positioned within said through-hole in a thickness direction of said bottom wall of said casing when said lock member is in a lock position.

10. A tape cassette as defined in claim 9, wherein said lock release actuation section of said lock member has a width substantially equal to a distance between opposite inner surfaces of said reel brake member along which said lock release actuation section is moved and is chamfered at each of both side edges of said bottom surface thereof to provide an inclination.

11. A tape cassette as defined in claim 2, wherein said lock member permits movement of said reel brake member within a range which keeps said brake pawls from being disengaged from said indentations of said tape reels while said brake pawls are kept engaged with said indentations of said tape reels during non-use of said tape cassette;

further movement of said reel brake member exceeding said range being regulated due to abutment of said holding sections of said lock member against said engagement members of said casing.

12. A tape cassette as defined in claim 11, wherein said brake release actuation section of said reel brake member includes an inclined surface arranged in proximity to said through-hole of said casing and adapted to be abutted against the brake releasing means of the recording and reproducing apparatus; and said lock member includes a lock release actuation section arranged so as to positionally correspond to said inclined surface and be moved close to and away from said inclined surface.

13. A tape cassette as defined in claim 11 or 12, wherein said engagement members of said casing is provided at a portion of said casing defined outside of a range of movement of said reel brake member;

said lock member includes a lock release actuation section pivotally supported at a pivotal support section provided on one of said reel brake member and casing and arranged in proximity to said through-hole of said casing;

said holding sections of said lock member is formed so as to extend from said lock release actuation section; and said lock member is forced by an elastic member so as to take a posture which permits said holding sections of said lock member to be engaged with said engagement members of said casing.

14. A tape cassette as defined in claim 11 or 12, wherein said brake pawls of said reel brake member each include a thin-wall hinge section, to thereby be elastically deformable, and are forced in a direction of engagement with said indentations of said tape reels, so that said lock member keeps said brake pawls engaged with said indentations of said tape reels when said holding sections of said lock member takes said posture which permits said holding sections of said lock member to be engaged with said engagement members of said casing.

15. A tape cassette as defined in claim 13, wherein said brake pawls of said reel brake member each include a thin-wall hinge section, to thereby be elastically deformable, and are forced in a direction of engagement with said indentations of said tape reels, so that said lock member keeps said brake pawls engaged with said indentations of said tape reels when said holding sections of said lock member takes said posture which permits said holding sections of said lock member to be engaged with said engagement members of said casing.

16. A tape cassette as defined in claim 14, wherein said holding sections of said lock member and said engagement members of said casing, when any external force is not applied to said tape reels, are arranged so as to define a gap therebetween, to thereby be prevented from being engaged with each other.

17. A tape cassette as defined in claim 11 or 12, wherein said reel brake member is formed with cam grooves;

said lock member includes a lock release actuation section slidably supported in said cam grooves of said reel brake member and including a portion arranged in proximity to said through-hole of said casing; and said lock member is forced by an elastic member so as to take a posture which permits said holding sections of said lock member to be engaged with said engagement members of said casing.

18. A tape cassette as defined in claim 2, wherein said lock member includes support pins through which said lock member is pivotally supported on a pivotal support section provided on said reel brake member;

said support pins each being formed into a substantially elliptic shape in cross-section so as to have a width-reduced flat portion formed by partially removing a surface of said support pin and a round portion other than said width-reduced portion;

said pivotal support section of said reel brake member having an opening formed with a dimension substantially equal to a width of said width-reduced portion of said support pin or less so as to permit said support pin to be inserted into said pivotal support section therethrough.

19. A tape cassette as defined in claim 20 or 18, wherein said support pins of said lock member are each provided on a distal end thereof with a flange abutted against a side surface of said pivotal support section.

20. A tape cassette as defined in claim 2, wherein said lock member includes support pins through which said lock member is pivotally supported on a pivotal support section provided on said reel brake member;

said reel brake member includes a connection for connecting said brake release actuation section and brake pawls to each other; and said lock member includes a torsion spring for urging said lock member to a lock position;

said torsion spring having a coil portion fitted on each of said support pins of said lock member and held at one end thereof in a first spring receiving recess formed at said lock member and at the other end thereof in a second spring receiving recess formed between a projection provided on said connection of said reel brake member and a side surface of said brake release actuation section.

21. A tape cassette as defined in claim 20, wherein said torsion spring is so formed that said one end thereof is extended in a tangential direction of said coil portion and bent at an obtuse angle and said other end thereof is extended in a tangential direction of said coil portion and bent at a substantially right angle.

22. A tape cassette as defined in claim 20, wherein said torsion spring is so formed that said one end thereof is extended in a tangential direction of said coil portion and bent at an obtuse angle and said other end thereof is extended in a tangential direction of said coil portion and bent at a substantially right angle.

23. A tape cassette as defined in claim 1, wherein said casing is formed with a through-hole via which a reel brake releasing means of a recording and reproducing apparatus is inserted into said casing;

said tape reels each include a flange provided on an outer periphery thereof with indentations; and said reel brake member includes an operation member arranged in proximity to said through-hole of said casing and adapted to be abutted against the reel brake releasing means of the recording and reproducing apparatus, brake pawls engageable with said indentations of said tape reels and arranged so as to be movable due to movement of said operation member, and an elastic member for elastically forcing said operation member and brake pawls.

24. A tape cassette as defined in claim 23, wherein said lock member includes a second holding means engageable with said brake pawls of said brake member; and engagement of said holding sections of said lock member with said engagement members of said casing and engagement of said second holding means of said lock member with said brake pawls of said brake member leads to regulation of movement of said brake pawls, to thereby regulate movement of said reel brake member.

25. A tape cassette as defined in claim 1, wherein said reel brake member is made of a material different from that of said lock member.

26. A tape cassette as defined in claim 25, wherein said reel brake member is made of a composite material comprising any one base component selected from the group consisting of polyacetal resin and polypropylene resin and an elastomer component added in an amount of 5 to 30 wt % to said base component.

27. A tape cassette as defined in claim 26, wherein said elastomer component is butadiene rubber.

28. A tape cassette as defined in claim 26, wherein said composite material contains a lubricant in an mount of 1 to 10 wt. %.

29. A tape cassette as defined in claim 28, wherein said lubricant is silicon.

30. A tape cassette as defined in claim 25, wherein said lock member is made of any one material selected from the group consisting of polyacetal resin, polycarbonate resin, and a composite material consisting of polyacetal resin or polycarbonate resin and an inorganic additive added thereto in an amount of 3 to 20 wt%.

31. A tape cassette as defined in claim 30, wherein said inorganic additive is glass fiber.

32. A tape cassette as defined in claim 30, wherein said inorganic additive is calcium carbonate.

33. A recording and reproducing apparatus charged therein with a tape cassette including a casing in which a pair of tape reels having a tape-like medium wound thereon are rotatably received therein, a reel brake member engaged with the tape reels to brake rotation of the tape reels during non-use of the tape cassette and a lock member for preventing movement of the reel brake member, comprising:

a regulation release means for releasing said lock member and a reel brake release means for releasing braking of said reel brake member, wherein said regulation release means and said reel brake release means are adapted to respectively abut against said lock member of said tape cassette and said reel brake member of said tape cassette so as to move the lock member and the reel brake member into respective releasing positions when said tape cassette is charged in said recording and reproducing apparatus;

whereby said lock member is released prior to operation of release of said reel brake member.

34. A recording and reproducing apparatus as defined in claim 33, wherein said brake release means also acts as said regulation release means.

* * * * *

UNITED STATES PATENT AND TRADEMARK OFFICE
CERTIFICATE OF CORRECTION

PATENT NO. : 5,860,611
DATED : January 19, 1999
INVENTOR(S) : Ikebe et al.

It is certified that error appears in the above-identified patent and that said Letters Patent is hereby corrected as shown below:

Column 1, line 21, delete ",".

Column 1, line 48, "to form a gap" should read --a gap to form--.

Column 1, line 60, "to increase elastic force" should read --elastic force to increase--.

Column 5, line 24, "is" should read --are--.

Column 6, line 2, delete "the".

Column 7, line 53, "FIGS." should read --FIG.--.

Column 9, line 51, "8" should read --$8_1$--.

Column 10, line 10, "9" should read --90--.

Column 11, line 2, "$7^1$" should read --$7_1$--.

Column 11, line 8, "are" should read --is--.

Column 12, line 47, "31" should read --$3_1$--.

Column 13, line 16, "$7^3$" should read --$7_3$--.

Column 13, line 44, after "in" insert --it--.

UNITED STATES PATENT AND TRADEMARK OFFICE
CERTIFICATE OF CORRECTION

PATENT NO. : 5,860,611
DATED : January 19, 1999
INVENTOR(S) : Ikebe et al.

It is certified that error appears in the above-identified patent and that said Letters Patent is hereby corrected as shown below:

Column 13, line 47, "73" should read --$7_3$--.

Column 14, line 13, "paws" should read --pawls--.

Column 17, line 25, "were" should read --was--.

Column 17, line 59, after "in" insert --it--.

Column 19, line 11, "means" should read --members--.

Column 20, line 14, "is" should read --are--.

Column 20, line 22, "is" should read --are--.

Column 20, line 35, "takes" should read --take--.

Column 22, line 23, "mount" should read --amount--.

Signed and Sealed this

Thirteenth Day of July, 1999

Attest:

Attesting Officer

Q. TODD DICKINSON

Acting Commissioner of Patents and Trademarks